(12) United States Patent
Togino

(10) Patent No.: US 6,252,728 B1
(45) Date of Patent: Jun. 26, 2001

(54) IMAGE DISPLAY APPARATUS

(75) Inventor: Takayoshi Togino, Koganei (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/422,472

(22) Filed: Oct. 21, 1999

(30) Foreign Application Priority Data

Jan. 29, 1999 (JP) .................................. 11-022260

(51) Int. Cl.$^7$ ................................ G02B 3/02; G02B 5/04

(52) U.S. Cl. .................................... 359/834; 359/720

(58) Field of Search ............................... 359/833, 834, 359/631, 630, 720

(56) References Cited

U.S. PATENT DOCUMENTS

| | | |
|---|---|---|
| 4,026,641 | 5/1977 | Bosserman et al. . |
| 5,726,807 | * 3/1998 | Nakaoka et al. ...................... 359/631 |
| 5,917,656 | * 6/1999 | Hayakawa et al. .................. 359/631 |

FOREIGN PATENT DOCUMENTS 6-294943   10/1994   (JP) .

OTHER PUBLICATIONS

Yano, "Psychological Effects of Visual Angle for Steroscopic Images", The Journal of the Institute of Television Engineers of Japan, vol. 45, No. 12, 1991, pp. 1589–1596.

* cited by examiner

Primary Examiner—Cassandra Spyrou
Assistant Examiner—Jared Treas
(74) Attorney, Agent, or Firm—Pillsbury Winthrop LLP

(57) ABSTRACT

The invention relates to a slimmed-down, well weight-balanced image display apparatus which, while a wide angle of view is presented, ensures high resolving power and a large pupil diameter, and comprises a viewing optical system for viewing an image displayed on an image display device 3 and having generally positive refracting power. The viewing optical system comprises a relay optical element for forming a relay image 6 and an ocular optical element for forming an exit pupil 2 for guiding relay image 6 to an observer. The relay optical element comprises a prism member 5. The prism member 5 comprises an entrance surface 11, at least one reflecting surface 12 or 13, and an exit surface 14. The reflecting surface is constructed of a rotationally asymmetric surface capable of imparting power to a light beam and making correction for aberrations produced by decentration. The ocular optical element is constructed of a concave mirror 4 having a rotationally asymmetric surface capable of imparting power to a light beam and making correction for aberrations produced by decentration.

21 Claims, 18 Drawing Sheets

IMAGE DISPLAY APPARATUS

BACKGROUND OF THE INVENTION

The present invention relates generally to an image display apparatus, and more particularly to a head- or face-mounted image display apparatus that may be mounted on an observer's head or face for use.

In order to allow an individual to enjoy images on a large screen, image display apparatuses, especially head- or face-mounted image display apparatuses have now been under extensive development.

Among prior art head-mounted image display equipment, there is known an image display apparatus designed to transmit an image on a CRT or other image display device to an object surface by way of an image transmission device and throw the image on the object surface in the air by means of a toric reflecting surface (U.S. Pat. No. 4,026,641).

Another known image display apparatus is an apparatus proposed by the applicant, wherein once an image on a liquid crystal display device (LCD) or other image display device has been formed by a refraction type relay optical element, the image is guided to an observer's eyeball by way of an ocular optical element comprising a decentered concave mirror (JP-A 6-294943).

One important consideration for head-mounted image display equipment is that the overall size and weight of the equipment should be reduced, and the equipment should be mounted on the head be kept intact. The overall size of the equipment is primarily determined by the layout of the optical system involved therein.

A direct view type layout designed to magnify an image display device through a convex lens for direct viewing is unsuitable for equipment size reductions, because the amount of equipment projecting from the observer's face becomes large. To allow for a wide angle of view, it is required to use a large positive lens element and a large image display device. However, this results in increases in both the size and weight of the equipment.

To achieve an image display apparatus which allows an observer to view images for hours without causing fatigue thereto and is easily attachable to or detachable from the head, it is desired that an ocular optical element comprising a reflecting surface be located just in front of the observer's eyeballs. This layout then enables an image display device, an illumination optical element, etc. to be accommodated and arranged in a limited area in the vicinity of the observer's head, so that the amount of the apparatus projecting from the observer's face can be reduced simultaneously with reductions in the weight of the apparatus.

Another important consideration is to ensure a large angle of view. This is needed to add a sense of realism in image viewing. In particular, the three-dimensional appearance applied to a presented image is determined by the presented angle of view (ITEJ, Vol. 45, No. 12, pp. 1589–1596 (1991)).

Yet another important consideration is how an optical system capable of obtaining a wide angle of view and high resolving power is achieved.

To apply a three-dimensional and powerful appearance to the observer, it is required to ensure a presented angle of view of at least 40° (±20°) in the horizontal direction. At the same time, it is known that the effect is saturated in the vicinity of 120° (±60°). In other words, it is preferable that the angle of view is equal to or greater than 40° and as close to 120° as possible. When the aforesaid ocular optical element is a planar reflecting mirror, however, a very large image display device is needed so as to make light rays incident on the observer's eyeballs at an angle of view of greater than 40°. This results in increases in the overall size and weight of the apparatus.

Referring here to a concave mirror, it produces field curvature having strong concavity along its surface. When a planar image display device is located in the focal position of the concave mirror, it is thus impossible to obtain an image that is clearly discernible to the periphery of the field of view because of a distortion of the viewing image surface thereof. A method of locating the display surface of an image display device while it is distorted, too, is known as contemplated in the prior art (U.S. Pat. No. 4,026,641). Even though the image display device is located at the front focal position of a concave mirror so that the image display device can be magnified and thrown in the air by use of the concave mirror alone, however, it is then still difficult to obtain high resolving power when the angle of view of 40° or greater is provided, because of aberrations produced by the concave mirror.

When a refracting type relay optical element such as one shown in JP-A 6-294943 is used, the apparatus becomes large because the relay optical element is made up of a transmitting. In addition, decentration aberration cannot fully be corrected for by the transmitting lens element. It is thus required to locate a refracting type of decentration-correction optical element between the relay optical element and the concave mirror.

SUMMARY OF THE INVENTION

In view of such prior art problems as explained above, one particular object of the invention is to provide a slimmed-down, well weight-balanced image display apparatus which, while a wide angle of view is ensured, has ever-higher resolving power and an ever-larger exit pupil diameter. Another particular object of the invention is to provide a high-definition image display apparatus which can display a high-pixel image having 640×480 pixels (VGA) or more.

To accomplish the aforesaid objects, the present invention provides an image display apparatus comprising an image display device and a viewing optical system which forms an exit pupil for viewing an image displayed on the image display device and has generally positive refractive power, wherein:

the viewing optical system comprises a relay optical element constructed and arranged to form said image in the form of a relay image and an ocular optical element constructed and arranged to form an exit pupil for guiding said relay image to an observer, the relay optical element comprising a prism member formed of a medium having a refractive index n that is n>1, the prism member comprising an entrance surface through which a light beam leaving said image display device enters a prism, at least one reflecting surface at which said light beam is reflected within the prism, and an exit surface through which the light beam leaves the prism, with the at least one reflecting surface having a curved surface shape adapted to inpart optical power on the light beam. The curved surface is defined by a rotationally asymmetric surface for making correction for aberrations produced by decentration, and the ocular optical element including at least one concave mirror located between the exit surface of the prism member and an viewing side, the concave mirror being defined by a rotationally asymmetric curved surface adapted to impart optical power on the light beam upon reflection and to correct aberrations produced by decentration.

In what follows, an account will be given of why the above arrangement is used and how it acts.

The present invention successfully provides a slimmed-down, well weight-balanced, and high-resolution arrangement by using a viewing optical system which is designed to form an exit pupil for viewing an image displayed on an image display device and has generally positive refracting power in combination with a relay optical element comprising a prism member (a decentered prism) and an ocular optical element comprising a concave mirror. The present invention is characterized in that the dencentered prism having a relay action and an action on correction of decentration aberrations is used to obtain a slimmed-down, well weight-balanced and high-resolution viewing optical system upon mounted on the head.

More specifically, the viewing optical system according to the invention comprises a relay optical element for forming the displayed image in the form of a relay image and an ocular optical element which forms an exit pupil for guiding the relay image to an observer. The relay optical element comprises a prism member formed of a medium having a refractive index n that is n>1. The prism member comprises an entrance surface through which a light beam leaving the image display device enters a prism, at least one reflecting surface at which the light beam is reflected within the prism, and an exit surface through which the light beam leaves the prism, with the at least one reflecting surface having a curved surface shape adapted to impart optical power on the light beam. The curved surface is defined by a rotationally asymmetric surface adapted to correct for aberrations produced by decentration. The ocular optical element comprises a concave mirror which is defined by a rotationally asymmetric curved surface capable adapted to impart optical power on the light beam upon reflection and to correct aberrations produced by decentration.

A refracting optical element like a lens cannot have power without imparting curvature to its boundary surface. When light rays are refracted at the lens boundary surface, therefore, chromatic aberrations unavoidably occur due to the chromatic dispersion of the refracting optical element. Consequently, another refracting optical element is generally added for the purpose of making correction for the chromatic aberrations.

A reflection optical element such as a mirror or prism, on the other hand, is in principle free from chromatic aberrations even though power is imparted to its reflecting surface, and so can dispense with addition of another optical element which is used only for the purpose of correcting chromatic aberrations. From the standpoint of making correction for chromatic aberrations, an optical system using reflecting optical elements is smaller in the number of optical elements than that using refracting optical elements.

At the same time, the reflecting optical system using reflecting optical elements can be smaller in size than the refracting optical system because an optical path can be turned back.

A reflecting surface has to be assembled and regulated with high precision because it is more sensitive to decentration errors than a refracting surface. Among reflecting optical elements, however, a prism has fixed position relations with respect to its respective surfaces, and so can dispense with assembly precision higher than required and regulation steps more than required because the prism can be controlled by itself with respect to decentration.

Further, the prism has an entrance surface and an exit surface, both being refracting surfaces, and a reflecting surface as well, and so is higher in the degree of freedom in correction of aberrations than a mirror having a reflecting surface alone. Especially when a substantial part of the desired power is shared by the reflecting surface so that the powers of the entrance and exit surfaces, both being refracting surfaces, can be reduced, it is possible to make chromatic aberrations much smaller than those produced by a refracting optical element such as a lens while the degree of freedom in correction of aberrations is kept higher than that achieved by a mirror. Since the prism is filled therein with a transparent medium higher in the index of refraction than air, the optical path involved can be longer than can be possible with air, so that the optical elements can be much reduced in thickness and size than lenses or mirrors located in the air.

The viewing optical system is required to have good image formation capabilities not only at its center but also on its periphery. Referring here to a general co-axial optical system, the sign of the height of off-axis light rays is inverted before and after a stop, and so the symmetry of an optical element with respect to the stop is destroyed, causing off-axis aberrations to become worse. It is thus a general practice that off-axis aberrations are corrected by locating a refracting surface astride a stop, thereby ensuring symmetry with respect to the stop.

In the present invention, the prism member comprising an entrance surface through which a light beam leaving an image display device enters a prism, at least one reflecting surface at which the light beam is reflected within a prism and an exit surface through which the light beam leaves the prism, wherein the at least one reflecting surface has a curved shape adapted to impact optical power on the light beam. The which curved surface is defined by a rotationally asymmetric surface shape for making correction for aberrations produced by decentration, is located in combination with a concave mirror defined by a rotationally asymmetric curved surface adapted to apply optical power on the light beam upon reflection and to correct aberrations produced by decentration, so that decentration aberrations can be mutually corrected, thereby making satisfactory correction for not only axial aberrations but also off-axis aberrations. With only one prism member or mirror located, it is impossible to make perfect correction for decentration aberrations.

For the reason as mentioned above, one prism member is located in cooperation with one concave mirror which is positioned between the prism member and an exit pupil side, and an intermediate (relay) image formed by the prism member is guided to the observer by way of the concave mirror.

By use of such a basic arrangement, it is possible to achieve a slimmed-down, well weight-balanced viewing optical system which is smaller in the number of optical elements than an optical system using a refracting or relay optical element and a decentered concave mirror, and has good performance from its center to its periphery.

Here assume that a light ray reaching the center of a image surface upon passing through the center of an object point and the center of a pupil is defined as an axial chief ray, as viewed in a back ray tracing mode. Unless at least one reflecting surface is decentered with respect to the axial chief ray, then the incident ray and reflected ray of the axial chief ray take the same optical path with the result that the axial chief ray is cut off in the optical system. This in turn causes an image to be formed by only the light beam the central portion of which is cut off, resulting in the formation of an image the center of which is dark or failing to form any image at the central portion.

When the powered reflecting surface is decentered with respect to the axial chief ray, it is desired that at least one surface of the surfaces forming the prism member used herein be defined by a rotationally asymmetric surface. In view of correction of aberrations, it is particularly desired that at least one reflecting surface of the prism member be defined by a rotationally asymmetric surface. For the same reason, it is desired that the reflecting surface of the concave mirror used herein, too, be defined by a rotationally asymmetric surface.

The reason will now be explained at great length.

First of all, an account is given of the coordinate system, and rotationally asymmetric surface used herein.

Here let the Z-axis be an optical axis defined by a straight line section of the axial chief ray terminating at a first surface of the optical system, the Y-axis be an axis that is perpendicular to the Z-axis and lies in a decentered plane of each of the surfaces forming the viewing optical system, and the X-axis be an axis that is perpendicular to both the optical axis and the Y-axis. The light ray is traced in the back direction from the exit pupil toward the image plane.

Generally, a spherical lens system constructed of a spherical lens alone is designed such that spherical aberration produced at the spherical lens and aberrations such as coma and field curvature are mutually corrected at some surfaces, thereby reducing the aberrations throughout the system.

To make satisfactory correction for aberrations with a limited number of surfaces, on the other hand, rotationally symmetric aspheric surfaces, etc. are used. This is to reduce various aberrations produced at a spherical surface.

In a decentered optical system, however, it is impossible to make correction for rotationally asymmetric aberrations produced by decentration with a rotationally symmetric optical system. The rotationally asymmetric aberrations produced by decentration, for instance, include distortion and field curvature as well as axial astigmatism and coma.

An account is first given of rotationally asymmetric field curvature. For instance, assume that a ray from an object point at infinity is reflected at the concave mirror upon incidence thereon to form an image. Then, the back focal length of the concave mirror from its portion on which the ray is incident to an image plane is half of the radius of curvature of the portion on which the ray strikes, when there is air on the image plane side. Thereupon, the resultant image plane tilts with respect to the axial chief ray, as shown in FIG. 21. With a rotationally symmetric optical system, it is thus impossible to make correction for the rotationally symmetric field curvature.

To make correction for this tilting field curvature with a concave mirror M per se, which is a field curvature source, it is required to construct the concave mirror M of a rotationally asymmetric surface. Furthermore in this example, it is required to make curvature (refracting power) strong in the positive Y-axis direction and make curvature (refracting power) weak in the negative Y-axis direction. If a rotationally asymmetric surface having the same effect as in the aforesaid arrangement is incorporated together with the concave mirror M in the optical system, it then possible to obtain a flat image plane with the use of a reduced number of surfaces.

In view of correction of aberrations, it is preferable to use a rotationally asymmetric surface having no axis of rotational symmetry both within and without the plane, because the degree of freedom is increased.

Then, an account is given of rotationally asymmetric astigmatism.

As in the foregoing, the decentered concave mirror M also produces astigmatism with respect to an axial chief ray, as shown in FIG. 22. Correction of this astigmatism may be made by properly varying the curvatures of a rotationally asymmetric surface in its X-axis and Y-axis directions, as in the foregoing.

Subsequently, an account is given of rotationally asymmetric coma.

As in the foregoing, the decentered concave mirror M also produces coma with respect to an axial chief ray, as shown in FIG. 23. Correction of this coma may be made by varying the inclination of a rotationally asymmetric surface farther off the origin of an X-axis and properly altering the inclination of the surface depending on the positive or negative direction of a Y-axis.

In the image-formation optical system according to the invention, it is also possible to impart power to at least one rotationally asymmetric surface having the aforesaid reflecting action by decentering it with respect to an axial chief ray. with this arrangement, it is possible to make correction of decentration aberrations with the reflecting surface itself, which aberrations are produced by imparting power thereto. It is thus possible to make the power of the refracting surface of a prism weak, thereby reducing the occurrence of chromatic aberrations themselves.

Preferably, the rotationally asymmetric surface used herein should be a free-form surface symmetric with respect to plane, which surface has only one symmetric plane. As used herein, the free-form surface is defined by the following equation (a). In this regard, it is noted that the axis of the free-form surface is given by the Z-axis in the defining equation.

$$Z = cr^2 / \left[1 + \sqrt{\{1-(1+k)c^2r^2\}}\right] + \sum_{j=2}^{66} C_j X^m Y^n \tag{a}$$

Here the first term in equation (a) is a spherical term and the second term is a free-form surface term. In the spherical term, c is a vertex curvature, k is a cornic constant (conical constant), and $r=\sqrt{(X^2+Y^2)}$.

The free-form surface term is given by $$\sum_{j=2}^{66} C_j X^m Y^n =$$

$$C_2 X + C_3 Y + C_4 X^2 + C_3 Y + C_4 X^2 + C_5 XY + C_6 Y^2 + C_7 X^3 +$$
$$C_8 X^2 Y + C_9 XY^2 + C_{10} Y^3 + C_{11} X^4 + C_{12} X^3 Y + C_{13} X^2 Y^2 +$$
$$C_{14} XY^3 + C_{15} Y^4 + C_{16} X^5 + C_{17} X^4 Y + C_{18} X^3 Y^2 + C_{14} XY^3 +$$
$$C_{15} Y^4 + C_{16} X^5 + C_{17} X^4 Y + C_{18} X^3 Y^2 + C_{19} X^2 Y^3 + C_{20} XY^4 +$$
$$C_{21} Y^5 + C_{22} X^6 + C_{23} X^5 Y + C_{24} X^4 Y^2 + C_{25} X^3 Y^3 +$$
$$C_{26} X^2 Y^4 + C_{21} Y^5 + C_{22} X^6 + C_{23} X^5 Y + C_{24} X^4 Y^2 +$$
$$C_{25} X^3 Y^3 + C_{26} X^2 Y^4 + C_{27} XY^5 + C_{28} Y^6 + C_{29} X^7 + C_{30} X^6 Y +$$
$$C_{31} X^5 Y^2 + C_{32} X^4 Y^3 + C_{33} X^3 Y^4 C_{34} X^2 Y^5 + C_{35} XY^6 + C_{36} Y^7$$

where $C_j$ is a coefficient where j is an integer of 2 or greater.

Generally in the aforesaid free-form surface, both the X-Z plane and the Y-Z plane have no symmetric plane. In the present invention, however, the free-form surface is allowed to have only one symmetric plane parallel with the Y-Z plane by reducing all the odd-numbered powers with respect to X to zero. In defining equation (a), for instance, this may be achieved by reducing to zero the coefficients of terms $C_2$, $C_5$, $C_7$, $C_9$, $C_{12}$, $C_{14}$, $C_{16}$, $C_{18}$, $C_{20}$, $C_{23}$, $C_{25}$, $C_{27}$, $C_{29}$, $C_{31}$, $C_{33}$, $C_{35}$, . . .

Also, the free-form surface is allowed to have only one symmetric plane parallel with the X-Z plane by reducing all the odd-numbered powers with respect to Y to zero. In the afoersaid defining equation, for instance, this may be achieved by reducing to zero the coefficients of terms $C_3$, $C_5$, $C_8$, $C_{10}$, $C_{12}$, $C_{14}$, $C_{17}$, $C_{19}$, $C_{21}$, $C_{23}$, $C_{25}$, $C_{27}$, $C_{30}$, $C_{32}$, $C_{34}$, $C_{36}$, . . .

If a symmetric plane is given by either one of the directions of the aforesaid symmetric plane and, for instance, the optical system is decentered in the Y-axis direction with respect to the symmetric plane parallel with the Y-Z plane and decentered in the X-axis direction with respect to the symmetric plane parallel with the X-Z plane, it is then possible to make effective correction for rotationally asymmetric aberrations produced by decentration and, at the same time, improve productivity.

As mentioned above, the defining equation (a) is herein referred to as one example. The present invention is characterized in that by use of a rotationally asymmetric surface having only one symmetric plane, rotationally asymmetric aberrations produced by decentration are corrected simultaneously with productivity improvements. It is thus to be understood that the same is also true of any other defining equations.

In the present invention, the reflecting surface located within the prism member and the rotationally asymmetric surface of the concave mirror may be each constructed of a free-form surface symmetric with respect to plane, which surface has only one symmetric plane.

According to the present invention, the prism member may also be designed to have at least two reflecting surfaces, each having a rotationally asymmetric curved surface shape capable of making correction for aberrations produced by decentration.

One embodiment of this prism member comprises at least four optical action surfaces, e.g., a first surface that is an entrance surface, a second surface that reflects a light beam within the prism, a third surface that reflects the light beam within the prism and a fourth surface that is an exit surface. The first and second surfaces are opposed to each other with a medium located between them and the third and fourth surfaces are opposed to each other with a medium located between them, while an optical path for making a connection between the first and second surface intersects an optical path for making a connection between the third and fourth surfaces.

This embodiment corresponds to Examples 1 and 4 given later. Such a shaped prism has a high degree of freedom in correction of aberrations, and so is less susceptible to aberrations. The two reflecting surfaces are located in good symmetry and so are less susceptible to aberrations. This is because aberrations produced at the two reflecting surfaces cancel each other by the two reflecting surfaces. Due to the arrangement wherein the optical path crosses over itself within the prism, it is possible to make the length of the optical path longer than would be possible with a prism of the structure wherein an optical path is simply turned back, thereby reducing the size of the prism relative to the length of the optical path. A more preferable feature of this embodiment is that the two reflecting surfaces have powers of opposite signs. This can make more effective mutual correction of aberrations and, hence, achieve ever-higher resolving power.

In this case, both the second surface and the third surface may be designed to have a rotationally asymmetric surface shape capable of imparting power to the light beam and making correction for aberrations produced by decentration.

At least one surface of the first and fourth surfaces may also be designed to have a rotationally asymmetric surface shape capable of imparting power to the light beam and making correction for aberrations produced by decentration.

Another embodiment of the prism member comprises a first surface that does not only serve as an entrance surface but also allows a light beam reflected at a second surface to be reflected within a prism, a second surface that reflects a light beam entering the prism through the first surface, and a third surface that allows the light beam reflected at the second surface to leave the prism. This embodiment corresponds to Examples 2 and 3 given later. With this type of prism having a combined entrance and reflecting surface, it is possible to reduce the thickness of the prism member in the incident ray direction, because an incident ray is reflected at the first reflecting surface (second surface) with a small angle of bending toward the second reflecting surface (first surface), and then bent at the second reflecting surface with a large angle of bending.

In this case, both the first surface and the second surface may be designed to have a rotationally asymmetric surface shape capable of imparting power to the light beam and making correction for aberrations produced by decentration.

The third surface, too, may be designed to have a rotationally asymmetric surface shape capable of imparting power to the light beam and making correction for aberrations produced by decentration.

Yet another embodiment of the prism member comprises at least five optical action surfaces, e.g., a first surface that is an entrance surface, a second surface that reflects a light beam within a prism, a third surface that reflects the light beams within the prism, a fourth surface that reflects the light beam within the prism and a fifth surface that is an exit surface. The second and third surfaces are opposed to each other with a medium located between them and the fourth and fifth surfaces are opposed to each other with a medium located between them, while an optical path of connecting the second surface with the third surface intersects an optical path of connecting the fourth surface with the fifth surface.

This embodiment corresponds to Examples 5 to 7 given later. Such a shaped prism including three reflecting surfaces has a high degree of freedom in correction of aberrations, and so is less susceptible to aberrations. The third and fourth reflecting surfaces are located in good symmetry and so are less susceptible to aberrations. This is because aberrations produced at the two reflecting surfaces cancel each other by the two reflecting surfaces. Due to the arrangement wherein the optical path crosses over itself within the prism, it is possible to make the length of the optical path longer than would be possible with a prism of the structure wherein an optical path is simply turned back, thereby reducing the size of the prism relative to the length of the optical path. A more preferable feature of this embodiment is that the third and fourth surfaces have powers of opposite signs. This can make more effective mutual correction of aberrations and, hence, achieve ever-higher resolving power.

In this case, both the third surface and the fourth surface may be designed to have a rotationally asymmetric surface shape capable of imparting power to the light beam and making correction for aberrations produced by decentration.

The second surface, too, may be designed to have a rotationally asymmetric surface shape capable of imparting power to the light beam and making correction for aberrations produced by decentration.

All the second, third and fourth surfaces may be designed to have positive powers.

At least one surface of the first and fifth surfaces may be designed to have a rotationally asymmetric surface shape capable of imparting power to the light beam and making correction for aberrations produced by decentration.

In this embodiment, the rotationally asymmetric surface of the prism member may be constructed of a free-form surface symmetric with respect to plane, which surface has only one symmetric plane.

In this case, the only one symmetric plane of each surface may be formed on the same plane.

In the present invention, it is understood that other forms of decentered prism may be used, which comprises one or more reflecting surfaces of rotationally asymmetric surface shape that are capable of imparting power to a light beam and making correction for aberrations produced by decentration.

The concave mirror that forms the ocular optical element according to the present invention may be constructed of a half-coated mirror for enabling the observer to view the outside world.

Instead of the concave mirror, a diffraction type optical element or hologram for enabling the observer to view the outside world may be used.

Now the powers of the decentered optical element and optical surfaces are defined. As shown in FIG. 24, let us assume that the direction of decentration of a decentered optical element S is in the X-axis direction unlike the foregoing assumption that the direction of decentration is in the X-axis direction. Here let δx denote an angle which a light ray leaving the decentered optical element upon incidence of a light ray having a minute height d within the X-Z plane parallel with an axial chief ray makes with respect to the axial chief ray upon projection onto the X-z plane, δx/d represent power PX of the decentered optical element S in the X direction, δy represent an angle which a light ray leaving the decentered optical element S upon incidence of the light ray having a minute height d in the Y direction parallel with the axial chief ray and perpendicular to the X-Z plane makes with respect to the axial chief ray upon projection onto a plane perpendicular to the X-Z plane and including the axial chief ray, and δy/d represent power PY of the decentered optical element S in the Y direction. Powers PXsn and PYsn in the x and Y directions of a decentered optical surface forming the decentered optical element S are then defined in the same manner as mentioned above.

Here let PX represent power in the X direction of the overall viewing optical system in the image display apparatus according to the present invention, and PY denote power in the Y direction of the same. Then, it is important to satisfy the following condition:

$$0.5 < PX/PY < 1.3 \tag{1}$$

This condition correlates to image size in the X, and Y directions. At less than the lower limit of 0.5, the power in the Y direction becomes too large with respect to the power in the X direction, and so the size of the image in the Y direction becomes too small with respect to that in the X direction. At greater than the upper limit of 1.3, on the contrary, the power in the Y direction becomes too small with respect to the power in the X direction, and so the size of the image in the Y direction becomes too large with respect to that in X direction.

More preferably, it is important to satisfy the following condition:

$$0.7 < PX/PY < 1.2 \tag{1-1}$$

The meanings of the upper and lower limits to this conditions are the same as explained above.

Even more preferably, it is important to satisfy the following condition:

$$0.8 < PX/PY < 1.1 \tag{1-2}$$

The meanings of the upper and lower limits to this conditions are the same as explained above.

Then, let PX represent the power in the X direction of the overall viewing optical system in the image display apparatus according to the invention, PY represent the power in the Y direction of the same, and PXs3 and PYs3 represent the powers of the concave mirrors located in front of the observer's eyeballs. It is then important to satisfy at least one of the following conditions:

$$0.1 < |PXs3/PX| < 2 \tag{2}$$

$$0.1 < |PYs3/PY| < 2 \tag{3}$$

These conditions give a definition of the power profile of the concave mirror and the power profile of the decentered relay optical element functioning as a projecting optical element. At less than the lower limit of 0.1, the power of the concave mirror becomes small; that is, unless the projection magnification of the relay optical element is increased, it is then impossible to present a wide image. However, the increase in the projection magnification of the relay optical element gives rise to an increase in the object-image distance of the relay optical element, and so makes it difficult to reduce the size of the optical system. At greater than the upper limit of 2, on the other hand, the power of the concave mirror becomes too strong, causing decentration aberrations produced by the decentered concave mirror to become too large to be corrected by the relay optical element.

More preferably, it is important to satisfy at least one of the following conditions:

$$0.3 < |PXs3/PX| < 1 \tag{2-1}$$

$$0.3 < |PYs3/PY| < 1 \tag{3-1}$$

The meanings of the upper and lower limits to these conditions are the same as explained above.

More preferably, it is important to satisfy at least one of the following conditions:

$$0.4 < |PXs3/PX| < 0.7 \tag{2-2}$$

$$0.4 < |PYs3/PY| < 0.7 \tag{3-2}$$

The meanings of the upper and lower limits to these conditions are the same as explained above.

Next, let PX represent the power in the X direction of the overall viewing optical system in the image display apparatus according to the invention, PY represent the power in the Y direction of the same, and PPX and PPY represent the powers of the relay optical element. Then, it is important to satisfy at least one of the following conditions:

$$0.01 < |PPX/PX| < 3 \tag{4}$$

$$0.01 < |PPY/PY| < 3 \tag{5}$$

These conditions give a definition of the power profile of the decentered relay optical element functioning as a projecting optical element. At less than the lower limit of 0.01, the power of the relay optical element becomes too small or the focal length of the relay optical element becomes too long to reduce the size of the optical system. At greater than the upper limit of 3, on the contrary, the focal length of the relay optical element becomes too short to allow the relay optical element to make correction for decentration aberrations due to the decentered concave mirror.

More preferably, it is important to satisfy at least one of the following conditions:

$$0.1 < |PPX/PX| < 2 \quad (4\text{-}1)$$

$$0.1 < |PPY/PY| < 2 \quad (5\text{-}1)$$

The meanings of the upper and lower limits to these conditions are the same as explained above.

Even more preferably, it is important to satisfy at least one of the following conditions:

$$0.4 < |PPX/PX| < 1.5 \quad (4\text{-}2)$$

$$0.4 < |PPY/PY| < 1.5 \quad (5\text{-}2)$$

The meanings of the upper and lower limits to these conditions are the same as explained above.

Next, let $\theta$ represent the angle of incidence of the axial chief ray reflected at the concave mirror. Then, it is important to satisfy the following condition:

$$10° < \theta < 45° \quad (6)$$

This condition gives a definition of the amount of decentration of the concave mirror. At less than the lower limit of 10°, it is required to locate the relay optical element in the vicinity of the eyeball. This causes the peripheral field of view of the observer to be blocked by the relay optical element or the relay optical element to interfere with observer's spectacles, making it impossible for the observer to view an image with spectacles on. At greater than the upper limit of 45°, on the other hand, the amount of decentration of the concave mirror becomes too large for the relay optical element to make correction for decentration aberrations produced at the concave mirror.

More preferably, the following condition 6-1 should be satisfied.

$$15° < \theta < 30° \quad (6\text{-}1)$$

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

In what follows, the image display apparatus of the invention is explained with reference to Examples 1 to 7 of the viewing optical system. It is here noted that these examples are explained with reference to back ray tracing from an exit pupil toward an image plane with an image display device located thereon. Constructive parameters in each example will be enumerated later.

Figure 1:
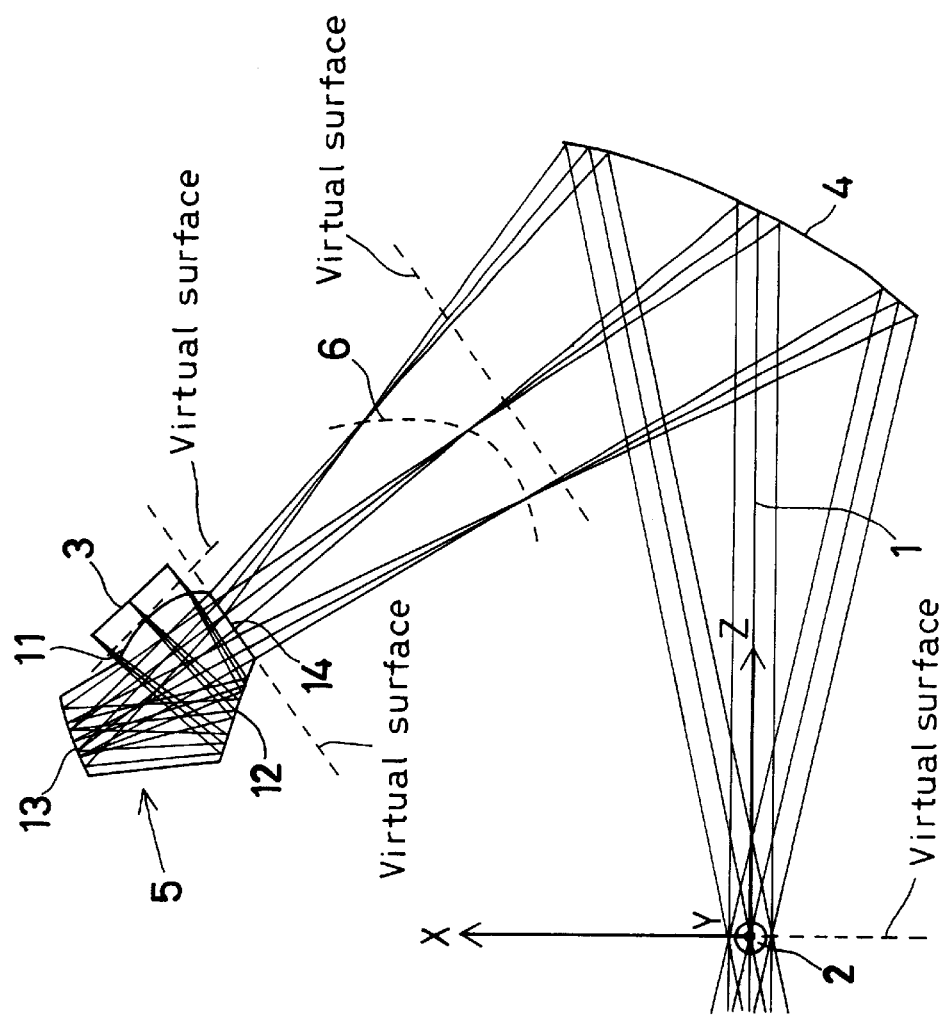
FIG. 1 is an optical path diagram for Example 1 of the image display apparatus according to the invention.

Throughout the examples, an axial chief ray 1 is defined by a light ray leaving the center of an object, passing through the center of a pupil (exit pupil) and arriving at the center of an image plane (image display surface) 3, as shown in FIG. 1. Passing through points of intersection of the axial chief ray 1 with a surface of a pupil 2, a surface of a concave mirror 4 located on an exit side and in the vicinity of an intermediate image and an entrance (fourth) surface 14 and an exit (first) surface 11 of a decentered prism 5, virtual surfaces are assumed for the surface of the pupil 2 and the surface of the concave mirror 4 located on the exit side and in the vicinity of the intermediate image. Virtual surfaces are also assumed for the entrance surface of the decentered prism 5 in a vertical direction with respect to the axial chief ray 1 incident thereon, and for the exit surface of the decentered prism 5 in a vertical direction with respect to the axial chief ray 1 leaving that surface. Here assume that the point of intersection of each virtual surface is defined as the origin of a portion of the decentered optical surface from an optical surface passing through that point of intersection to the next virtual surface (the image plane for the final virtual surface). For the points of intersection of the axial chief ray with the surface of the pupil 2, the surface of the concave mirror 4 located on the exit side and in the vicinity of the intermediate image and the entrance surface of the decentered prism 5, a direction along the incident axial chief ray 1 is defined as the Z-axis direction; for the point of the axial chief ray with the exit surface of the decentered prism 5, a direction along the emergent axial chief ray 1 is defined as the positive Z-axis direction; and for the first virtual surface passing through the point of intersection of the axial chief ray 1 with the surface of the pupil 2, a direction along the direction of propagation of the axial chief ray 1 is defined as the positive Z-axis direction. For other virtual surface, assume that when the number of reflection in an optical path from the first virtual surface to the virtual surface is an even number, the direction along the direction of propagation of the axial chief ray 1 is defined as the positive Z-axis direction, and when the number of reflection is an odd number, a direction opposite to the direction of propagation of the axial chief ray 1 is defined as the positive Z-axis direction. Further, assume that a plane including this Z-axis and the center of the image plane is defined as the X-Z plane; a direction perpendicular to the X-Z plane through the origin and coming out of the paper is defined as the positive Y-axis direction; and an axis forming right-handed orthogonal coordinates with the Y- and X-axes. Illustrated in FIG. 1 are the virtual surfaces, and the coordinate system with respect the first virtual surface prescribed for the point of intersection of the axial chief ray with the surface of the pupil 2. In FIGS. 2 to 7, however, these virtual surfaces and coordinate systems are not shown.

In Examples 1 to 8, each surface is decentered in the X-Z plane, and the only one symmetric plane of each rotationally asymmetric free-form surfaces is defined by the X-Z plane.

Given to each decentered surface are the amount of decentration of the vertex position of the surface from the origin of the corresponding coordinate system (X, Y, and Z in the X-, Y-, and Z-axis directions) and the center axis of the surface (given to the free-form surface are tilt angles with respect to the X-, Y-, and Z-axes in the aforesaid equation (a); $\alpha°$, $\beta°$, and $\gamma°$). It is here noted that the positive $\alpha$ and $\beta$ mean counterclockwise rotation with respect to their positive axis directions, and the positive $\gamma$ means clockwise rotation with respect to the positive Z-axis direction.

It is noted that when, of the optical action surfaces forming the optical system in each example, a certain specific surface (including a virtual surface therefor) and the subsequent surface forms a co-axial optical system, a surface separation therebetween as well as the index of refraction and Abbe constant of the medium are given thereto according to conventional methods. Referring to the sign of the surface separation, when the number of reflection in an optical path from the first virtual surface to its reference optical surface (including a virtual surface therefor) is an even number, a positive value is given thereto, and when the number of reflection is an odd number, a negative value is given thereto. It is also noted that the distance along the direction of propagation of the axial chief ray 1 always assumes a positive value.

The shape of the free-form surface used herein is defined by the aforesaid equation (a), and the Z-axis therein provides the axis of the free-form surface.

It is here noted that the terms with respect to free-form surfaces without data are zero. The indices of refraction given are on a d-line (587.56 nm wavelength) basis, and the lengths are given in mm.

The free-form surface may also be defined by other defining equation, for instance, Zernike polynominal (b). For example, the shape of the free-form surface may be defined by the following equation. The axis of Zernike polynomial is given by the Z-axis of this defining equation. A rotationally asymmetric surface is defined by the polar coordinates for the height of the Z-axis with respect to the X-Y plane. A is a distance from the Z-axis within the X-Y plane, and R is an azimuthal angle around the Z-axis represented by an angle of rotation as measured with respect to the Z-axis.

$$x = R \times \cos(A) \qquad (b)$$

$$y = R \times \sin(A)$$

$$Z = D_2 + D_3 R\cos(A) + D_4 R\sin(A) + D_5 R^2 \cos(2A) +$$
$$D_6(R^2 - 1) + D_7 R^2 \sin(2A) + D_8 R^3 \cos(3A) +$$
$$D_9(3R^3 - 2R)\cos(2A) + D_{10}(3R^3 - 2R)\sin(A) +$$
$$D_{11} R^3 \sin(3A) + D_{12} R^4 \cos(4A) + D_{13}(4R^4 - 3R^2)\cos(2A) +$$
$$D_{14}(6R^4 - 6R^2 + 1) + D_{15}(4R^4 - 3R^2)\sin(2A) +$$
$$D_{16} R^4 \sin(4A) + D_{17} R^5 \cos(5A) +$$
$$D_{18}(5R^5 - 4R^3)\cos(3A) + D_{19}(10R^5 - 12R^3 + 3R)\cos(A) +$$
$$D_{20}(10R^5 - 12R^3 + 3R)\sin(A) + D_{21}(5R^5 - 4R^3)\sin(3A) +$$
$$D_{22} R^5 \sin(5A) + D_{23} R^6 \cos(6A) + D_{24}(6R^6 - 5R^4)\cos(4A) +$$
$$D_{25}(15R^6 - 20R^4 + 6R^2)\cos(2A) +$$
$$D_{26}(20R^6 - 30R^4 + 12R^2 - 1) +$$
$$D_{27}(15R^6 - 20R^4 + 6R^2)\sin(2A) +$$
$$D_{28}(6R^6 - 5R^4)\sin(4A) + D_{29} R^5 \sin(6A)...$$

To design an optical system symmetric in the X-axis direction, $D_4$, $D_5$, $D_6$, $D_{10}$, $D_{11}$, $D_{12}$, $D_{13}$, $D_{14}$, $D_{20}$, $D_{21}$, $D_{22}$, . . . should be used.

Further, the free-form surface may be defined by the following defining equation (d):

$$Z = \Sigma\Sigma C_{nm} XY$$

For instance, this equation may be expanded with respect to k =7 (seventh term) to obtain:

$$Z = C_2 + C_3y + C_4|x| + C_5y^2 + C_6y|x| + C_7x^2 + C_8y^3 + C_9y^2|x| + \qquad (c)$$
$$C_{10}yx^2 + C_{11}|x^3| + C_{12}y^4 + C_{13}y^3|x| + C_{14}y^2x^2 + C_{15}y|x^3| +$$
$$C_{16}x^4 + C_{17}y^5 + C_{18}y^4|x| + C_{19}y^3x^2 + C_{20}y^2|x^3| + C_{21}yx^4 +$$
$$C_{22}|x^5| + C_{23}y^6 + C24y5|x| + C_{25}y^4x^2 + C_{26}y^3|x^3| +$$
$$C_{27}y^2x^4 + C_{28}y^4|x^5| + C_{29}x^6 + C_{30}y^7 + C_{31}y^6|x| + C_{32}y^5x^2 +$$
$$C_{33}y^4|x^3| + C_{34}y^3x^4 + C_{35}y^2|x^5| + C_{26}yx^6 + C_{37}|x^7|\ldots$$

While, in the examples to be described later, the surface shape is expressed in terms of the free-form surface defined by equation (a), it is understood that the same advantages are achievable even with equations (b) and (c).

In Examples 1 to 7, the viewing angle is 12.5° in terms of the horizontal half angle of view and 9.44° in terms of the vertical half angle of view, and the image display device has a size of 9.55×7.16 mm with a pupil diameter of 4 mm.

Figure 4:
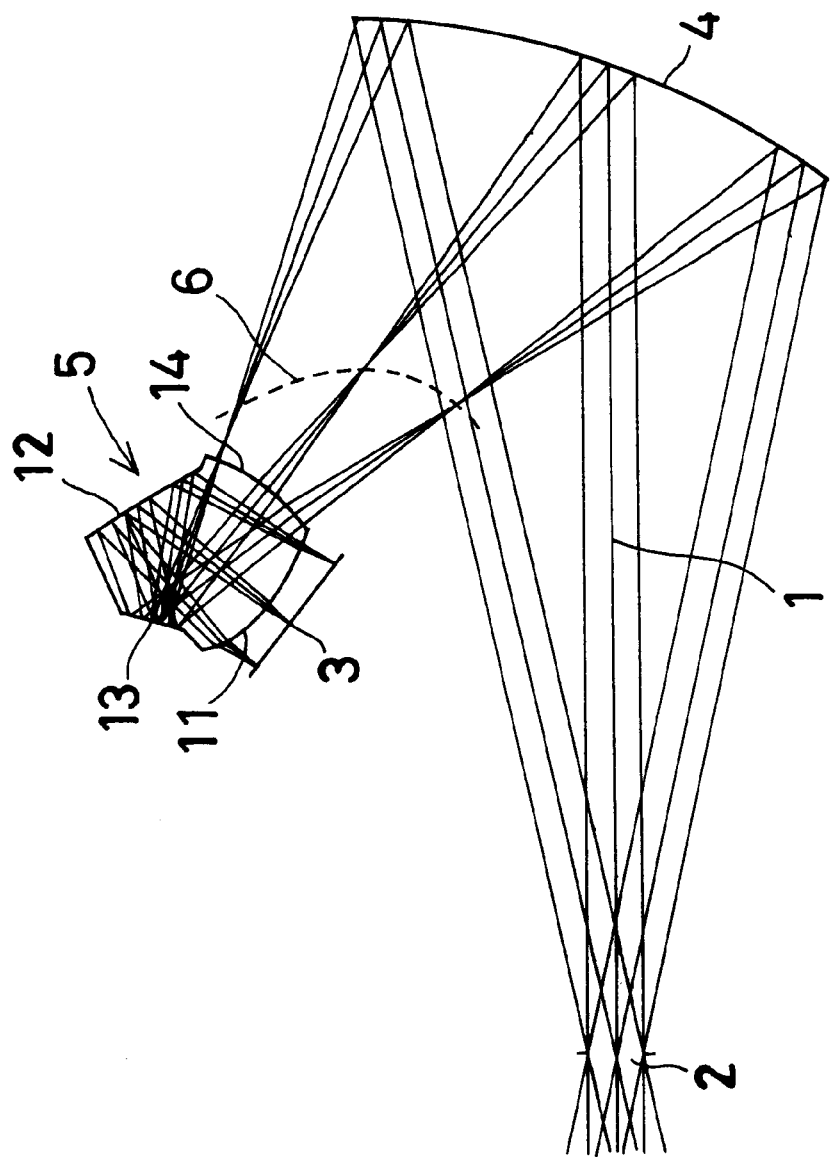
FIG. 4 is an optical path diagram for Example 4 of the image display apparatus according to the invention.

X-Z sectional diagrams for Examples 1 and 4 including optical axes are attached hereto as FIGS. 1 and 4, respectively. Examples 1 and 4 are each directed to an image display apparatus comprising a pupil 2, a concave mirror 4, an intermediate image plane 6, a decentered prism 5 and an image (image formation) plane 3, as viewed in the order reverse to that of ray tracing from the pupil 2 side (as viewed in a back ray tracing mode). The decentered prism 5 is made up of first to fourth surfaces 11 to 14, wherein the fourth surface 14 permits a light beam traveling from the pupil 2 side in the reverse direction and reflected at the concave mirror 4 in the decentration direction to enter the decentered prism 5, the third surface 13 permits a light beam incident from the fourth surface 14 to be reflected within the prism, the second surface 12 permits a light beam reflected at the third surface 13 to be reflected within the prism, and the first surface 11 permits a light beam reflected at the second surface 12 to leave the prism. The first surface 11 and second surface 12 are opposed to each other with a prism medium located between them and the third surface 13 and fourth surface 14 are opposed to each other with a prism medium located between them, while an optical path for connecting the first surface 11 with the second surface 12 intersects an optical path for connecting the third surface 13 with the fourth surface 14. A difference between Examples 1 and 4 is that the directions of reflection of the light beam at the third surface 13 within the prism 5 are opposite to each other, i.e., whether the image plane 3 is positioned on the pupil 2 side (FIG. 4) or on the side facing away from the pupil 2 (FIG. 1) with respect to the decentered prism 5.

The constructive parameters (referred to later) with respect to the third and fourth surfaces are expressed in terms of the amount of decentration on the basis of a virtual surface 1 for the second surface, the vertex position of the fifth surface (virtual surface 3) is expressed only in terms of the surface separation along an axial chief ray from a virtual surface 2 for the fourth surface 4, the constructive parameters with respect to sixth and tenth surfaces are expressed in terms of the amount of decentration on the basis of the virtual surface 3 for the fifth surface 5, and the image plane is expressed in terms of the surface separation along an axial chief ray from a virtual surface 4 for the tenth surface.

Figure 2:
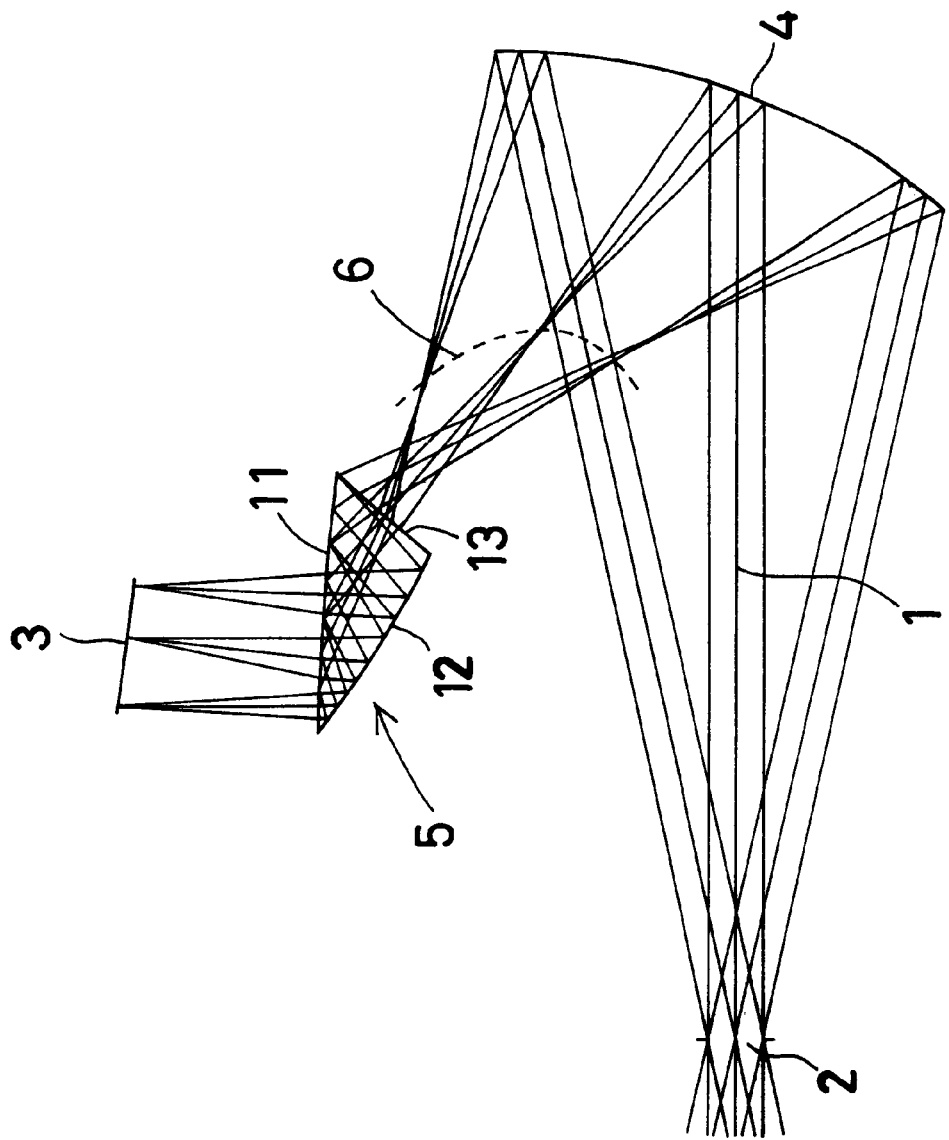
FIG. 2 is an optical path diagram for Example 2 of the image display apparatus according to the invention.
Figure 3:
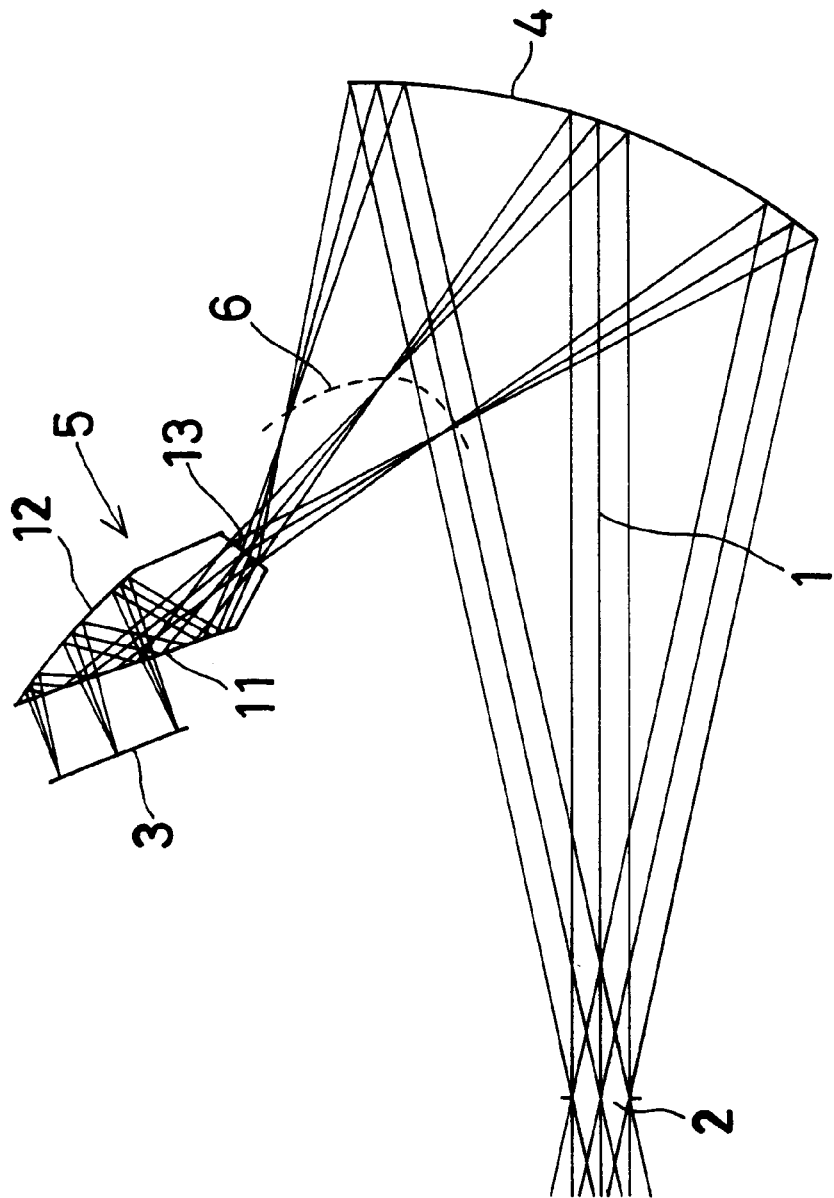
FIG. 3 is an optical path diagram for Example 3 of the image display apparatus according to the invention.

X-Z sectional diagrams for Examples 2 and 3 including optical axes are attached hereto as FIGS. 2 and 3, respectively. Examples 2 and 3 are each directed to an image display apparatus comprising a pupil 2, a concave mirror 4, an intermediate image plane 6, a decentered prism 5 and an image (image formation) plane 3, as viewed in the order reverse to that of ray tracing from the pupil 2 side (as viewed in a back ray tracing mode). The decentered prism 5 is made up of first to third surfaces 11 to 13, wherein the third surface 13 permits a light beam traveling from the pupil 2 side in the reverse direction and reflected at the concave mirror 4 in the decentration direction to enter the decentered prism 5, the first surface 11 permits a light beam incident from the third surface 13 to be reflected within the prism and a light beam reflected at the second surface 12 to leave the prism, and the second surface 12 provides reflection of a light beam reflected at the first surface 11. Thus, the first surface 11 of the decentered prism 5 is constructed as the same optical action surface having a combined transmitting and reflecting action. A difference between Examples 2 and 3 is that the directions of reflection of the light beam at the first surface 11 within the prism 5 are opposite to each other, i.e., whether the image plane 3 is positioned on the pupil 2 side (FIG. 3) or on the side facing away from the pupil 2 (FIG. 2) with respect to the decentered prism 5.

The constructive parameters (referred to later) with respect to the third and fourth surfaces are expressed in terms of the amount of decentration on the basis of a virtual surface 1 for the second surface, the vertex position of the fifth surface (virtual surface 3) is expressed only in terms of the surface separation along an axial chief ray from a virtual surface 2 for the fourth surface 4, the constructive parameters with respect to the sixth to tenth surfaces are expressed in terms of the amount of decentration on the basis of the virtual surface 3 for the fifth surface 5, and the image plane is expressed in terms of the surface separation along an axial chief ray from a virtual surface 4 for the tenth surface.

Figure 5:
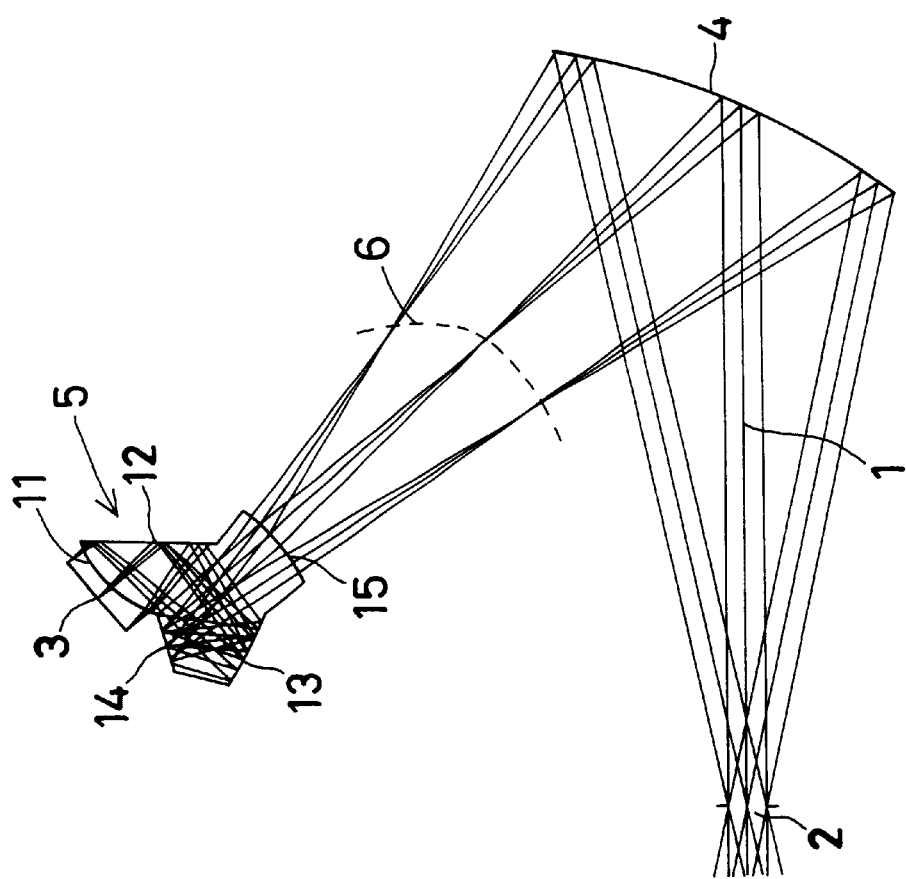
FIG. 5 is an optical path diagram for Example 5 of the image display apparatus according to the invention.
Figure 6:
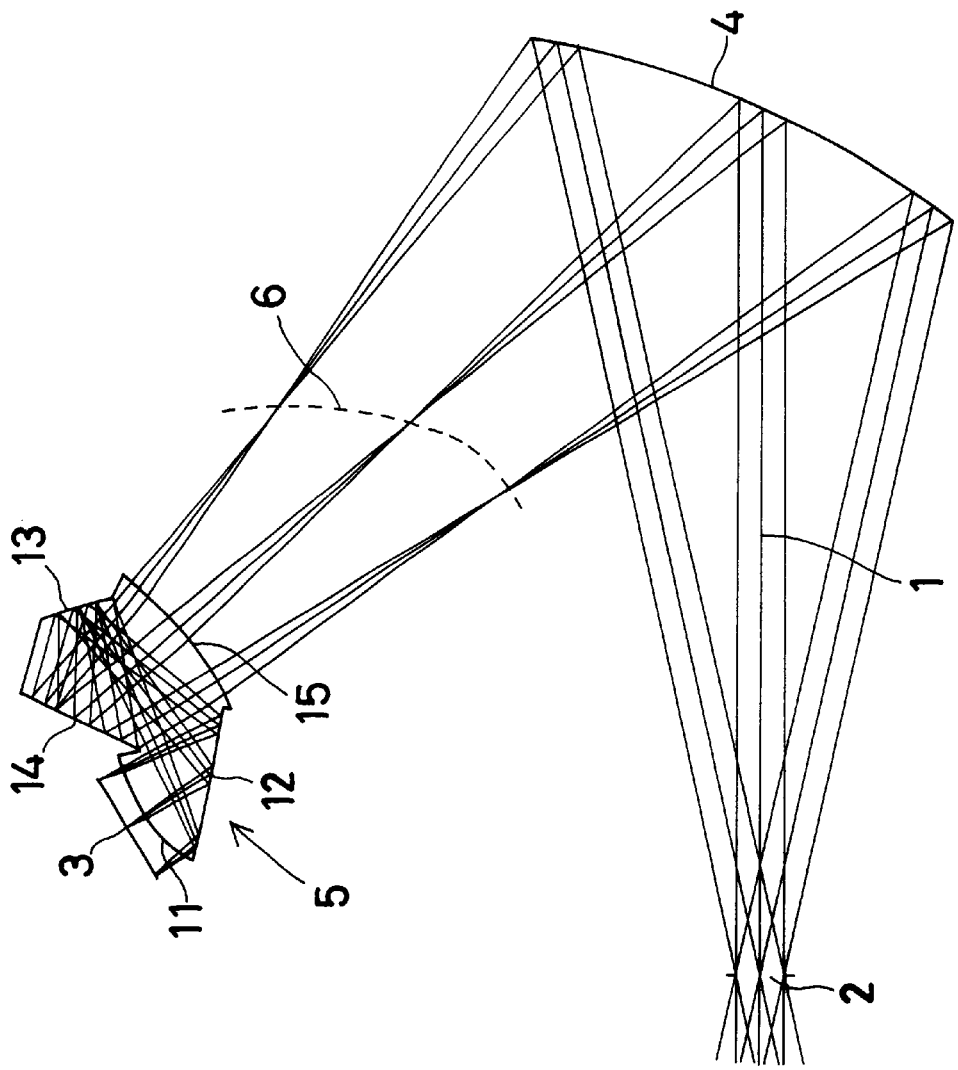
FIG. 6 is an optical path diagram for Example 6 of the image display apparatus according to the invention.
Figure 7:
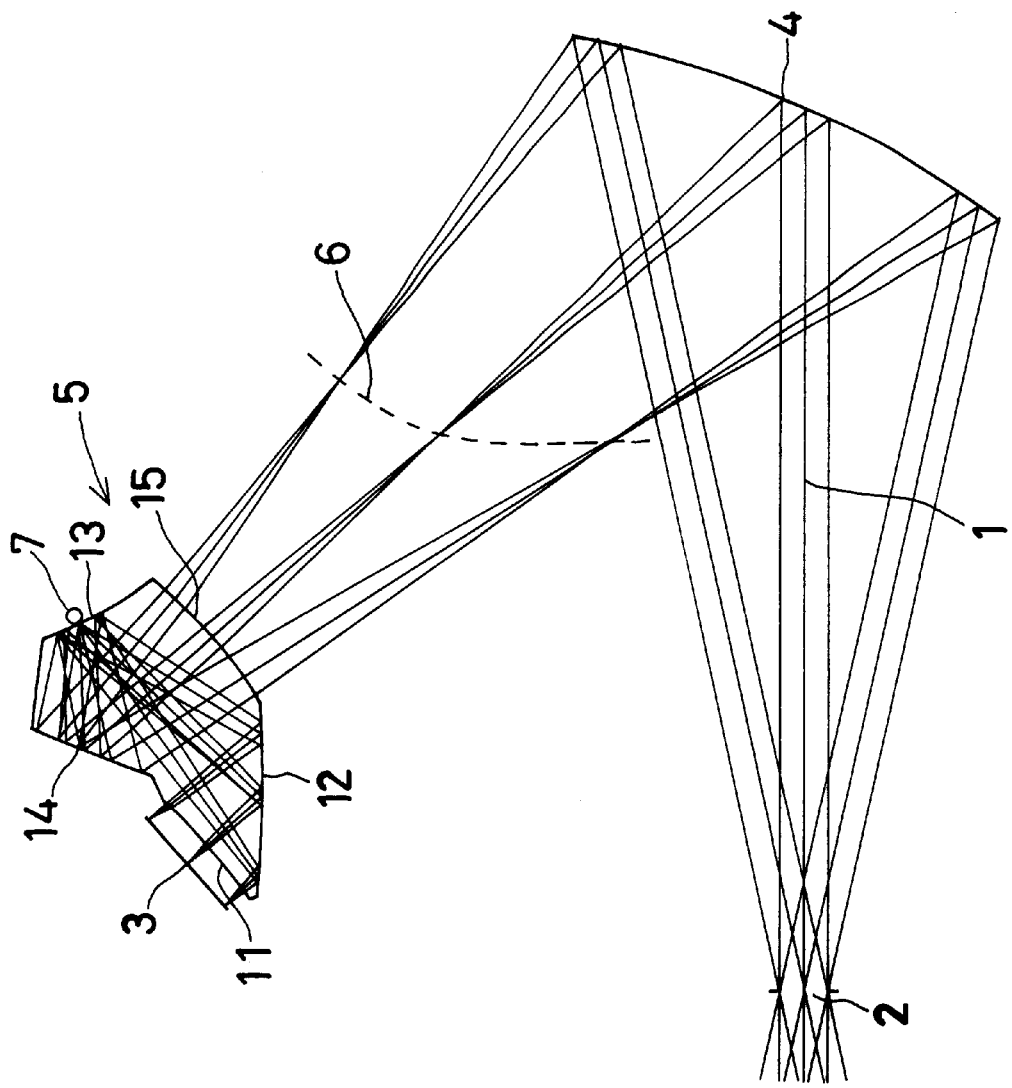
FIG. 7 is an optical path diagram for Example 7 of the image display apparatus according to the invention.

X-Z sectional diagrams for Examples 5 to 7 including optical axes are attached hereto as FIGS. 5 to 7, respectively. Examples 5 to 7 are each directed to an image display apparatus comprising a pupil 2, a concave mirror 4, an intermediate image plane 6, a decentered prism 5 and an image (image formation) plane 3, as viewed in the order reverse to that of ray tracing from the pupil 2 side (as viewed in a back ray tracing mode). The decentered prism 5 is made up of first to fifth surfaces 11 to 15, wherein the fifth surface 15 permits a light beam traveling from the pupil 2 side in the reverse direction and reflected at the concave mirror 4 in the decentration direction to enter the decentered prism 5, the fourth surface 14 permits a light beam incident from the fifth surface 15 to be reflected within the prism, the third surface 13 permits a light beam reflected at the fourth surface 14 to be reflected within the prism, the second surface 12 permits a light beam reflected at the third surface 13 to be reflected within the prism, and the first surface 11 permits a light beam reflected at the second surface 12 to leave the prism. The second surface 12 and third surface 13 are opposed to each other with a prism medium located between them and the fourth surface 14 and fifth surface 15 are opposed to each other with a prism medium located between them, while an optical path for connecting the second surface 12 with the third surface 13 intersects an optical path for connecting the fourth surface 14 with the fifth surface 15. A difference between Example 5 and Examples 6, 7 is that the directions of reflection of the light beam at the fourth surface 14 within the prism 5 are opposite to each other, i.e., whether the image plane 3 is positioned on the pupil 2 side (FIGS. 6, 7) or on the side facing away from the pupil 2 (FIG. 5) with respect to the decentered prism 5.

In Example 7 shown in FIG. 7, the third surface or reflecting surface 13 with a stop positioned thereon is provided with a hole, in which a light source 7 is located. Illumination light guided from the hole is reflected at the second surface 12, and leaves the prism through the first surface 11, so that an image display device such as a reflection-type LCD positioned on the image plane 3 can be illuminated.

The constructive parameters (referred to later) with respect to the third and fourth surfaces are expressed in terms of the amount of decentration on the basis of a virtual surface 1 for the second surface, the vertex position of the fifth surface (virtual surface 3) is expressed only in terms of the surface separation along an axial chief ray from a virtual surface 2 for the fourth surface 4, the constructive parameters with respect to sixth to eleventh surfaces are expressed in terms of the amount of decentration on the basis of the virtual surface 3 for the fifth surface 5, and the image plane is expressed in terms of the surface separation along an axial chief ray from a virtual surface 4 for the eleventh surface.

It is understood that the image display optical system of the invention is usable even with other sizes, and that the invention includes not only an image display apparatus using the viewing optical system of the invention but also other equipment with the optical system built therein.

Set out below are the constructive parameters in Examples 1 to 7. As used hereinafter, the abbreviations "FFS" and "HRP" stand for the "free-form surface" and "virtual surface", respectively.

EXAMPLE 1

| Surface No. | Radius of curvature | Surface separation | Displacement and tilt | Refractive index | Abbe's No. |
|---|---|---|---|---|---|
| Object plane | ∞ | −1000.00 | | | |
| 1 | ∞ (Stop) | 0.00 | | | |
| 2 | ∞ (HRP1) | | | | |
| 3 | FFS ① | | (1) | | |
| 4 | ∞ (HRP2) | −32.76 | (2) | | |
| 5 | ∞ (HRP3) | | | | |
| 6 | FFS ② | | (3) | 1.4924 | 57.6 |
| 7 | FFS ③ | | (4) | 1.4924 | 57.6 |
| 8 | FFS ④ | | (5) | 1.4924 | 57.6 |
| 9 | FFS ⑤ | | (6) | | |
| 10 | ∞ (HRP 4) | −2.00 | (7) | | |
| Image plane | ∞ | | | | |

FFS ①
$C_4$ −6.4809 × 10⁻³   $C_6$ −6.5389 × 10⁻³   $C_7$ −1.3562 × 10⁻⁵
$C_9$ −1.8827 × 10⁻⁵

FFS ②
$C_4$ −1.3203 × 10⁻²   $C_6$ −5.4254 × 10⁻²   $C_7$ 3.0362 × 10⁻⁴
$C_9$ −9.0856 × 10⁻⁴

FFS ③
$C_4$ 1.1542 × 10⁻²   $C_6$ 6.7556 × 10⁻⁴   $C_7$ −1.4651 × 10⁻⁵
$C_9$ −2.4138 × 10⁻⁴

FFS ④
$C_4$ 4.6069 × 10⁻³   $C_6$ −1.5303 × 10⁻²   $C_7$ 2.9034 × 10⁻⁴
$C_9$ −2.8459 × 10⁻⁵

FFS ⑤
$C_4$ 5.2451 × 10⁻²   $C_6$ 5.1792 × 10⁻²   $C_7$ 3.9040 × 10⁻³
$C_9$ −1.4161 × 10⁻³

Displacement and tilt(1)

| | | | | | |
|---|---|---|---|---|---|
| X | 0.00 | Y | 0.00 | Z | 67.55 |
| α | 0.00 | β | 26.55 | γ | 0.00 |

Displacement and tilt(2)

| | | | | | |
|---|---|---|---|---|---|
| X | 23.81 | Y | 0.00 | Z | 49.67 |
| α | 0.00 | β | 53.09 | γ | 0.00 |

Displacement and tilt(3)

| | | | | | |
|---|---|---|---|---|---|
| X | 0.00 | Y | 0.00 | Z | 0.00 |
| α | 0.00 | β | −0.85 | γ | 0.00 |

Displacement and tilt(4)

| | | | | | |
|---|---|---|---|---|---|
| X | −0.09 | Y | 0.00 | Z | −17.85 |
| α | 0.00 | β | 14.56 | γ | 0.00 |

Displacement and tilt(5)

| | | | | | |
|---|---|---|---|---|---|
| X | −7.75 | Y | 0.00 | Z | −4.25 |
| α | 0.00 | β | 55.32 | γ | 0.00 |

Displacement and tilt(6)

| | | | | | |
|---|---|---|---|---|---|
| X | 4.23 | Y | 0.00 | Z | −6.10 |
| α | 0.00 | β | 78.84 | γ | 0.00 |

Displacement and tilt(7)

| | | | | | |
|---|---|---|---|---|---|
| X | 4.23 | Y | 0.00 | Z | −6.10 |
| α | 0.00 | β | 82.41 | γ | 0.00 |

EXAMPLE 2

| Surface No. | Radius of curvature | Surface separation | Displacement and tilt | Refractive index | Abbe's No. |
|---|---|---|---|---|---|
| Object plane | ∞ | −1000.00 | | | |
| 1 | ∞ (Stop) | 0.00 | | | |
| 2 | ∞ (HRP1) | | | | |
| 3 | FFS ① | | (1) | | |
| 4 | ∞ (HRP2) | −17.62 | (2) | | |
| 5 | ∞ (HRP3) | | | | |
| 6 | FFS ② | | (3) | 1.4924 | 57.6 |
| 7 | FFS ③ | | (4) | 1.4924 | 57.6 |
| 8 | FFS ④ | | (5) | 1.4924 | 57.6 |
| 9 | FFS ⑤ | | (4) | | |
| 10 | ∞ (HRP4) | −14.59 | (6) | | |
| Image plane | ∞ | | | | |

FFS ①
$C_4$ −1.0096 × 10⁻²   $C_6$ −1.1215 × 10⁻²   $C_7$ 3.8211 × 10⁻⁷
$C_9$ −8.5010 × 10⁻⁵

FFS ②
$C_4$ −1.3881 × 10⁻²   $C_6$ 5.8629 × 10⁻²   C 2.0568 × 10⁻³
$C_9$ −4.2457 × 10⁻³

FFS ③
$C_4$ 3.1657 × 10⁻³   $C_6$ −2.5463 × 10⁻²   $C_7$ −5.0275 × 10⁻⁵
$C_9$ −5.1624 × 10⁻⁴

FFS ④
C4 −8.6060 × 10⁻³   C6 −2.5996 × 10⁻²   $C_7$ −1.7706 × 10⁻⁴
$C_9$ 2.6022 × 10⁻⁴

Displacement and tilt(1)

| | | | | | |
|---|---|---|---|---|---|
| X | 0.00 | Y | 0.00 | Z | 70.00 |
| α | 0.00 | β | 20.00 | γ | 0.00 |

Displacement and tilt(2)

| | | | | | |
|---|---|---|---|---|---|
| X | 14.73 | Y | 0.00 | Z | 52.44 |
| α | 0.00 | β | 40.00 | γ | 0.00 |

Displacement and tilt(3)

| | | | | | |
|---|---|---|---|---|---|
| X | 0.00 | Y | 0.00 | Z | 0.00 |
| α | 0.00 | β | 0.00 | γ | 0.00 |

Displacement and tilt(4)

| | | | | | |
|---|---|---|---|---|---|
| X | 0.00 | Y | 0.00 | Z | −6.70 |
| α | 0.00 | β | 55.33 | γ | 0.00 |

Displacement and tilt(5)

| | | | | | |
|---|---|---|---|---|---|
| X | −6.00 | Y | 0.00 | Z | −8.96 |
| α | 0.00 | β | 83.01 | γ | 0.00 |

Displacement and tilt(6)

| | | | | | |
|---|---|---|---|---|---|
| X | −3.08 | Y | 0.00 | Z | −10.98 |
| α | 0.00 | β | 56.43 | γ | 0.00 |

EXAMPLE 3

| Surface No. | Radius of curvature | Surface separation | Displacement and tilt | Refractive index | Abbe's No. |
|---|---|---|---|---|---|
| Object plane | ∞ | −1000.00 | | | |
| 1 | ∞ (Stop) | 0.00 | | | |
| 2 | ∞ (HRP1) | | | | |
| 3 | FFS ① | | (1) | | |
| 4 | ∞ (HRP2) | −20.89 | (2) | | |
| 5 | ∞ (HRP3) | | | | |
| 6 | FFS ② | | (3) | 1.4924 | 57.6 |
| 7 | FFS ③ | | (4) | 1.4924 | 57.6 |
| 8 | FFS ④ | | (5) | 1.4924 | 57.6 |
| 9 | FFS ⑤ | | (4) | | |
| 10 | ∞ (HRP4) | −5.86 | (6) | | |
| Image plane | ∞ | | | | |

FFS ①
$C_4$ −9.8340 × 10$^{-3}$  $C_6$ −1.0506 × 10$^{-2}$  $C_7$ −2.4469 × 10$^{-5}$
$C_9$ −3.3071 × 10$^{-5}$

FFS ②
$C_4$ −9.1091 × 10$^{-2}$  $C_5$ −8.7855 × 10$^{-2}$  $C_7$ −4.7291 × 10$^{-4}$
$C_9$ 1.5047 × 10$^{-3}$

FFS ③
$C_4$ −3.0394 × 10$^{-4}$  $C_6$ 2.6694 × 10$^{-3}$  $C_7$ −4.6579 × 10$^{-5}$
$C_9$ 1.1331 × 10$^{-3}$

FFS ④
$C_4$ −1.1970 × 10$^{-2}$  $C_6$ −1.4839 × 10$^{-2}$  $C_7$ 6.7739 × 10$^{-5}$
$C_9$ 1.2618 × 10$^{-3}$

Displacement and tilt(1)
| X | 0.00 | Y | 0.00 | Z | 70.00 |
| α | 0.00 | β | 20.00 | γ | 0.00 |

Displacement and tilt(2)
| X | 12.05 | Y | 0.00 | Z | 55.64 |
| α | 0.00 | β | 40.00 | γ | 0.00 |

Displacement and tilt(3)
| X | 0.00 | Y | 0.00 | Z | 0.00 |
| α | 0.00 | β | 0.00 | γ | 0.00 |

Displacement and tilt(4)
| X | 0.00 | Y | 0.00 | Z | −9.69 |
| α | 0.00 | β | −58.06 | γ | 0.00 |

Displacement and tilt(5)
| X | 6.00 | Y | 0.00 | Z | −12.63 |
| α | 0.00 | β | −88.08 | γ | 0.00 |

Displacement and tilt(6)
| X | 2.92 | Y | 0.00 | Z | −14.41 |
| α | 0.00 | β | −60.79 | γ | 0.00 |

EXAMPLE 4

| Surface No. | Radius of curvature | Surface separation | Displacement and tilt | Refractive index | Abbe's No. |
|---|---|---|---|---|---|
| Object plane | ∞ | −1000.00 | | | |
| 1 | ∞ (Stop) | 0.00 | | | |
| 2 | ∞ (HRP1) | | | | |
| 3 | FFS ① | | (1) | | |
| 4 | ∞ (HRP2) | −12.47 | (2) | | |
| 5 | ∞ (HRP3) | | | | |
| 6 | FFS ② | | (3) | 1.4924 | 57.6 |
| 7 | FFS ③ | | (4) | 1.4924 | 57.6 |
| 8 | FFS ④ | | (5) | 1.4924 | 57.G |
| 9 | FFS ⑤ | | (6) | | |
| 10 | ∞ (HRP4) | −2.00 | (7) | | |
| Image plane | ∞ | | | | |

FFS ①
$C_4$ −8.4472 × 10$^{-3}$  $C_6$ −9.3935 × 10$^{-3}$  $C_7$ −8.8487 × 10$^{-7}$
$C_9$ −5.3784 × 10$^{-5}$

FFS ②
$C_4$ 3.1437 × 10$^{-2}$  $C_6$ 1.0041 × 10$^{-2}$  $C_7$ −2.3320 × 10$^{-3}$
$C_9$ −1.2347 × 10$^{-3}$

FFS ③
$C_4$ 1.1113 × 10$^{-2}$  $C_6$ 1.6971 × 10$^{-2}$  $C_7$ 6.5520 × 10$^{-5}$
$C_9$ −1.2986 × 10$^{-4}$

FFS ④
$C_4$ −8.3380 × 10$^{-3}$  $C_6$ −6.9282 × 10$^{-3}$  $C_7$ 8.4100 × 10$^{-4}$
$C_9$ −1.9074 × 10$^{-5}$

FFS ⑤
$C_4$ 4.8025 × 10$^{-2}$  $C_6$ 6.7309 × 10$^{-2}$  $C_7$ 3.0137 × 10$^{-3}$
$C_9$ −3.3813 × 10$^{-3}$

Displacement and tilt(1)
| X | 0.00 | Y | 0.00 | Z | 70.00 |
| α | 0.00 | β | 20.00 | γ | 0.00 |

Displacement and tilt(2)
| X | 16.61 | Y | 0.00 | Z | 50.20 |
| α | 0.00 | β | 40.00 | γ | 0.00 |

Displacement and tilt(3)
| X | 0.00 | Y | 0.00 | Z | 0.00 |
| α | 0.00 | β | 0.50 | γ | 0.00 |

Displacement and tilt(4)
| X | 0.04 | Y | 0.00 | Z | −12.41 |
| α | 0.00 | β | −24.98 | γ | 0.00 |

Displacement and tilt(5)
| X | 6.75 | Y | 0.00 | Z | −6.80 |
| α | 0.00 | β | −71.10 | γ | 0.00 |

Displacement and tilt(6)
| X | −5.39 | Y | 0.00 | Z | −6.36 |
| α | 0.00 | β | −90.84 | γ | 0.00 |

Displacement and tilt(7)
| X | −5.39 | Y | 0.00 | Z | −6.36 |
| α | 0.00 | β | −92.69 | γ | 0.00 |

EXAMPLE 5

| Surface No. | Radius of curvature | Surface separation | Displacement and tilt | Refractive index | Abbe's No. |
|---|---|---|---|---|---|
| Object plane | ∞ | −1000.00 | | | |
| 1 | ∞ (Stop) | 0.00 | | | |
| 2 | ∞ (HRP1) | | | | |
| 3 | FFS ① | | (1) | | |
| 4 | ∞ (HRP2) | −44.42 | (2) | | |
| 5 | ∞ (HRP3) | | | | |
| 6 | FFS ② | | (3) | 1.4924 | 57.6 |
| 7 | FFS ③ | | (4) | 1.4924 | 57.6 |
| 8 | FFS ④ | | (5) | 1.4924 | 57.6 |
| 9 | FFS ⑤ | | (6) | 1.4924 | 57.6 |
| 10 | FFS ⑥ | | (7) | | |
| 11 | ∞ (HRP4) | 2.00 | (8) | | |
| Image plane | ∞ | | | | |

FFS ①
$C_4$ −6.0989 × 10$^{-3}$  $C_6$ −7.5290 × 10$^{-3}$  $C_7$ −1.2846 × 10$^{-5}$
$C_9$ 8.1531 × 10$^{-6}$

FFS ②
$C_4$ −3.0399 × 10$^{-2}$  $C_6$ 7.0270 × 10$^{-4}$  $C_7$ −4.9988 × 10$^{-4}$
$C_9$ 2.6310 × 10$^{-3}$

FFS ③
$C_4$ 3.8841 × 10$^{-3}$  $C_6$ 9.3131 × 10$^{-3}$  $C_7$ −1.2775 × 10$^{-4}$

-continued

| | | | | | | | |
|---|---|---|---|---|---|---|---|
| $C_9$ | $6.4626 \times 10^{-4}$ | | | | | | |
| | | FFS ④ | | | | | |
| $C_4$ | $-5.5975 \times 10^{-3}$ | $C_6$ | $-7.3938 \times 10^{-3}$ | $C_7$ | $-1.2853 \times 10^{-4}$ | | |
| $C_9$ | $4.9638 \times 10^{-4}$ | | | | | | |
| | | FFS ⑤ | | | | | |
| $C_4$ | $-5.0897 \times 10^{-4}$ | $C_6$ | $-2.0905 \times 10^{-2}$ | $C_7$ | $-2.3161 \times 10^{-4}$ | | |
| $C_9$ | $-7.7429 \times 10^{-4}$ | | | | | | |
| | | FFS ⑥ | | | | | |
| $C_4$ | $-4.4706 \times 10^{-2}$ | $C_6$ | $-5.6469 \times 10^{-2}$ | $C_7$ | $-1.2405 \times 10^{-3}$ | | |
| $C_9$ | $-2.7685 \times 10^{-3}$ | | | | | | |

Displacement and tilt(1)

| X | 0.00 | Y | 0.00 | Z | 73.64 |
|---|---|---|---|---|---|
| α | 0.00 | β | 24.44 | γ | 0.00 |

Displacement and tilt(2)

| X | 16.53 | Y | 0.00 | Z | 59.21 |
|---|---|---|---|---|---|
| α | 0.00 | β | 48.89 | γ | 0.00 |

Displacement and tilt(3)

| X | 0.00 | Y | 0.00 | Z | 0.00 |
|---|---|---|---|---|---|
| α | 0.00 | β | 0.00 | γ | 0.00 |

Displacement and tilt(4)

| X | 0.00 | Y | 0.00 | Z | −15.37 |
|---|---|---|---|---|---|
| α | 0.00 | β | 24.63 | γ | 0.00 |

Displacement and tilt(5)

| X | −7.11 | Y | 0.00 | Z | −9.25 |
|---|---|---|---|---|---|
| α | 0.00 | β | 69.27 | γ | 0.00 |

Displacement and tilt(6)

| X | 7.05 | Y | 0.00 | Z | −9.43 |
|---|---|---|---|---|---|
| α | 0.00 | β | 134.73 | γ | 0.00 |

Displacement and tilt(7)

| X | 7.08 | Y | 0.00 | Z | −16.08 |
|---|---|---|---|---|---|
| α | 0.00 | β | 175.37 | γ | 0.00 |

Displacement and tilt(8)

| X | 7.08 | Y | 0.00 | Z | −16.08 |
|---|---|---|---|---|---|
| α | 0.00 | β | 182.59 | γ | 0.00 |

EXAMPLE 6

| Surface No. | Radius of curvature | Surface separation | Displacement and tilt | Refractive index | Abbe's No. |
|---|---|---|---|---|---|
| Object plane | ∞ | −1000.00 | | | |
| 1 | ∞ (Stop) | 0.00 | | | |
| 2 | ∞ (HRP1) | | | | |
| 3 | FFS ① | | (1) | | |
| 4 | ∞ (HRP2) | −36.08 | (2) | | |
| 5 | ∞ (HRP3) | | | | |
| 6 | FFS ② | | (3) | 1.4924 | 57.6 |
| 7 | FFS ③ | | (4) | 1.4924 | 57.6 |
| 8 | FFS ④ | | (5) | 1.4924 | 57.6 |
| 9 | FFS ⑤ | | (6) | 1.4924 | 57.6 |
| 10 | FFS ⑥ | | (7) | | |
| 11 | ∞ (HRP4) | 2.00 | (8) | | |
| Image plane | ∞ | | | | |

| | | | | | | | |
|---|---|---|---|---|---|---|---|
| | | FFS ① | | | | | |
| $C_4$ | $-5.5256 \times 10^{-3}$ | $C_6$ | $-6.3684 \times 10^{-3}$ | $C_7$ | $-5.0823 \times 10^{-6}$ | | |
| $C_9$ | $-1.1763 \times 10^{-5}$ | | | | | | |
| | | FFS ② | | | | | |
| $C_4$ | $-2.1875 \times 10^{-2}$ | $C_6$ | $-3.1321 \times 10^{-2}$ | $C_7$ | $3.8776 \times 10^{-4}$ | | |
| $C_9$ | $-3.7323 \times 10^{-4}$ | | | | | | |
| | | FFS ③ | | | | | |
| $C_4$ | $2.8893 \times 10^{-3}$ | $C_6$ | $4.1114 \times 10^{-3}$ | $C_7$ | $9.1419 \times 10^{-5}$ | | |
| $C_9$ | $-5.3365 \times 10^{-5}$ | | | | | | |
| | | FFS ④ | | | | | |
| $C_4$ | $-6.7750 \times 10^{-3}$ | $C_6$ | $-4.6840 \times 10^{-3}$ | $C_7$ | $1.0729 \times 10^{-4}$ | | |

-continued

| | | | | | | | |
|---|---|---|---|---|---|---|---|
| $C_9$ | $-1.1164 \times 10^{-5}$ | | | | | | |
| | | FFS ⑤ | | | | | |
| $C_4$ | $-4.6263 \times 10^{-3}$ | $C_6$ | $-1.5036 \times 10^{-2}$ | $C_7$ | $-1.7706 \times 10^{-4}$ | | |
| $C_9$ | $-1.5742 \times 10^{-4}$ | | | | | | |
| | | FFS ⑥ | | | | | |
| $C_4$ | $-3.7290 \times 10^{-2}$ | $C_6$ | $-4.7066 \times 10^{-2}$ | $C_7$ | $-1.8481 \times 10^{-3}$ | | |
| $C_9$ | $-7.0720 \times 10^{-4}$ | | | | | | |

Displacement and tilt(1)

| X | 0.00 | Y | 0.00 | Z | 73.64 |
|---|---|---|---|---|---|
| α | 0.00 | β | 24.44 | γ | 0.00 |

Displacement and tilt(2)

| X | 22.82 | Y | 0.00 | Z | 53.72 |
|---|---|---|---|---|---|
| α | 0.00 | β | 48.89 | γ | 0.00 |

Displacement and tilt(3)

| X | 0.00 | Y | 0.00 | Z | 0.00 |
|---|---|---|---|---|---|
| α | 0.00 | β | 0.00 | γ | 0.00 |

Displacement and tilt(4)

| X | 0.00 | Y | 0.00 | Z | −11.60 |
|---|---|---|---|---|---|
| α | 0.00 | β | −23.61 | γ | 0.00 |

Displacement and tilt(5)

| X | 6.88 | Y | 0.00 | Z | −5.23 |
|---|---|---|---|---|---|
| α | 0.00 | β | −67.21 | γ | 0.00 |

Displacement and tilt(6)

| X | −11.31 | Y | 0.00 | Z | −6.12 |
|---|---|---|---|---|---|
| α | 0.00 | β | 50.98 | γ | 0.00 |

Displacement and tilt(7)

| X | −10.30 | Y | 0.00 | Z | −12.40 |
|---|---|---|---|---|---|
| α | 0.00 | β | 187.03 | γ | 0.00 |

Displacement and tilt(8)

| X | −10.30 | Y | 0.00 | Z | −12.40 |
|---|---|---|---|---|---|
| α | 0.00 | β | 190.22 | γ | 0.00 |

EXAMPLE 7

| Surface No. | Radius of curvature | Surface separation | Displacement and tilt | Refractive index | Abbe's No. |
|---|---|---|---|---|---|
| Object plane | ∞ | −1000.00 | | | |
| 1 | ∞ (Stop) | 0.00 | | | |
| 2 | ∞ (HRP1) | | | | |
| 3 | FFS ① | | (1) | | |
| 4 | ∞ (HRP2) | −38.36 | (2) | | |
| 5 | ∞ (HRP3) | | | | |
| 6 | FFS ② | | (3) | 1.4924 | 57.6 |
| 7 | FFS ③ | | (4) | 1.4924 | 57.6 |
| 8 | FFS ④ | | (5) | 1.4924 | 57.6 |
| 9 | FFS ⑤ | | (6) | 1.4924 | 57.6 |
| 10 | FFS ⑥ | | (7) | | |
| 11 | ∞ (HRP4) | 2.23 | (8) | | |
| Image plane | ∞ | | | | |

| | | | | | | | |
|---|---|---|---|---|---|---|---|
| | | FFS ① | | | | | |
| $C_4$ | $-5.3226 \times 10^{-3}$ | $C_6$ | $-5.8704 \times 10^{-3}$ | $C_7$ | $2.7310 \times 10^{-6}$ | | |
| $C_9$ | $1.1867 \times 10^{-6}$ | $C_{11}$ | $-6.7298 \times 10^{-7}$ | $C_{13}$ | $-7.5535 \times 10^{-7}$ | | |
| $C_{15}$ | $2.1944 \times 10^{-7}$ | | | | | | |
| | | FFS ② | | | | | |
| $C_4$ | $-1.6846 \times 10^{-2}$ | $C_6$ | $-1.0360 \times 10^{-2}$ | $C_7$ | $3.0977 \times 10^{-4}$ | | |
| $C_9$ | $-4.5810 \times 10^{-4}$ | $C_{11}$ | $1.0144 \times 10^{-4}$ | $C_{13}$ | $1.3956 \times 10^{-5}$ | | |
| $C_{15}$ | $-2.1274 \times 10^{-5}$ | | | | | | |
| | | FFS ③ | | | | | |
| $C_4$ | $4.5684 \times 10^{-3}$ | $C_6$ | $3.5155 \times 10^{-3}$ | $C_7$ | $1.1195 \times 10^{-4}$ | | |
| $C_9$ | $-2.0552 \times 10^{-4}$ | $C_{11}$ | $1.6931 \times 10^{-5}$ | $C_{13}$ | $-3.0846 \times 10^{-6}$ | | |
| $C_{15}$ | $-4.0005 \times 10^{-6}$ | | | | | | |
| | | FFS ④ | | | | | |
| $C_4$ | $-4.4922 \times 10^{-3}$ | $C_6$ | $-8.3343 \times 10^{-3}$ | $C_7$ | $1.6715 \times 10^{-4}$ | | |

-continued

| | | | | | | |
|---|---|---|---|---|---|---|
| $C_9$ | $-1.4531 \times 10^{-4}$ | $C_{11}$ | $2.2306 \times 10^{-5}$ | $C_{13}$ | $1.3527 \times 10^{-5}$ | |
| $C_{15}$ | $3.7195 \times 10^{-6}$ | | | | | |
| | FFS ⑤ | | | | | |
| $C_4$ | $-7.4129 \times 10^{-3}$ | $C_6$ | $-1.6077 \times 10^{-2}$ | $C_7$ | $-3.4397 \times 10^{-5}$ | |
| $C_9$ | $-1.5591 \times 10^{-4}$ | $C_{11}$ | $1.4912 \times 10^{-5}$ | $C_{13}$ | $2.1428 \times 10^{-6}$ | |
| $C_{15}$ | $-2.9998 \times 10^{-5}$ | | | | | |
| | FFS ⑥ | | | | | |
| $C_4$ | $2.6046 \times 10^{-2}$ | $C_6$ | $-1.3574 \times 10^{-2}$ | $C_7$ | $8.7972 \times 10^{-4}$ | |
| $C_9$ | $2.3441 \times 10^{-3}$ | $C_{11}$ | $-7.0651 \times 10^{-4}$ | $C_{13}$ | $4.7878 \times 10^{-4}$ | |
| $C_{15}$ | $-6.9296 \times 10^{-4}$ | | | | | |

Displacement and tilt(1)

| X | 0.00 | Y | 0.00 | Z | 73.64 |
|---|---|---|---|---|---|
| α | 0.00 | β | 24.44 | γ | 0.00 |

Displacement and tilt(2)

| X | 21.10 | Y | 0.00 | Z | 55.22 |
|---|---|---|---|---|---|
| α | 0.00 | β | 48.89 | γ | 0.00 |

Displacement and tilt(3)

| X | 0.00 | Y | 0.00 | Z | 0.00 |
|---|---|---|---|---|---|
| α | 0.00 | β | 0.00 | γ | 0.00 |

Displacement and tilt(4)

| X | 0.00 | Y | 0.00 | Z | -14.16 |
|---|---|---|---|---|---|
| α | 0.00 | β | -25.41 | γ | 0.00 |

Displacement and tilt(5)

| | 8.30 | Y | 0.00 | Z | -7.39 |
|---|---|---|---|---|---|
| α | 0.00 | β | -72.76 | γ | 0.00 |

Displacement and tilt(6)

| X | -12.85 | Y | 0.00 | Z | -5.65 |
|---|---|---|---|---|---|
| α | 0.00 | β | 42.46 | γ | 0.00 |

Displacement and tilt(7)

| X | -12.89 | Y | 0.00 | Z | -11.68 |
|---|---|---|---|---|---|
| α | 0.00 | β | 178.91 | γ | 0.00 |

Displacement and tilt(8)

| X | -12.89 | Y | 0.00 | Z | -11.68 |
|---|---|---|---|---|---|
| α | 0.00 | β | 180.00 | γ | 0.00 |

Figure 8:
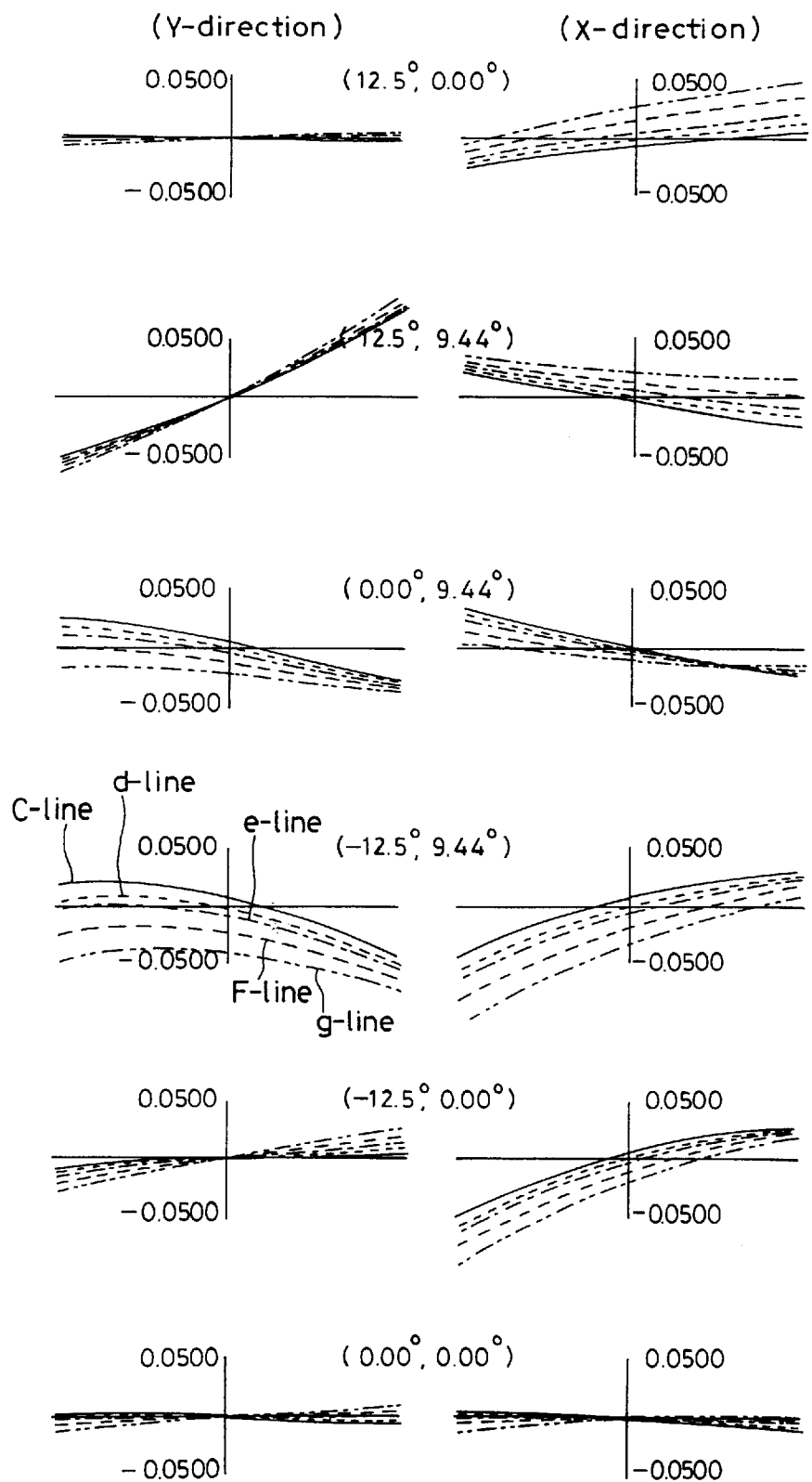
FIG. 8 is a transverse aberration diagram for Example 1.

A transverse aberration diagram for Example 1 is attached hereto as FIG. 8, wherein bracketed numerals represent the angles of view (in the horizontal (X) and vertical (Y) directions) at which aberrations are found.

Enumerated below are values for Examples 1 to 7 with respect to conditions (1) to (6).

| Example | 1 | 2 | 3 | 4 | 5 | 6 | 7 |
|---|---|---|---|---|---|---|---|
| (1) | 1.110 | 0.963 | 1.051 | 0.961 | 0.989 | 1.022 | 0.862 |
| (2) | 0.545 | 0.774 | 0.731 | 0.688 | 0.524 | 0.470 | 0.542 |
| (3) | 0.610 | 0.828 | 0.821 | 0.735 | 0.639 | 0.554 | 0.515 |
| (4) | 0.952 | 1.728 | 1.678 | 1.464 | 0.893 | 0.885 | 1.331 |
| (5) | 0.259 | 1.611 | 1.783 | 1.450 | 1.270 | 0.452 | 0.989 |
| (6) | 26.546 | 20 | 20 | 20 | 24.444 | 24.443 | 24.443 |

While, in Examples 1 to 7 of the invention, a prism of the type capable of two or three internal reflections has been used for the decentered prism 5 that forms the relay optical element according to the invention, it is understood that the decentered prism 5 used for the viewing optical system according to the invention is not limited thereto, as typically shown at P in FIGS. 9 to 17. Each prism P is designed to form an image on an image plane 36 (corresponding to the image plane 3 in Examples 1 to 7) by way of an intermediate image plane 6 positioned at a great distance therefrom and a pupil 31. However, this prism P may be used as a prism designed to form an image on the pupil 31 side from the image plane 36 side by way of the intermediate image plane 6 in a back ray tracing manner.

Figure 9:
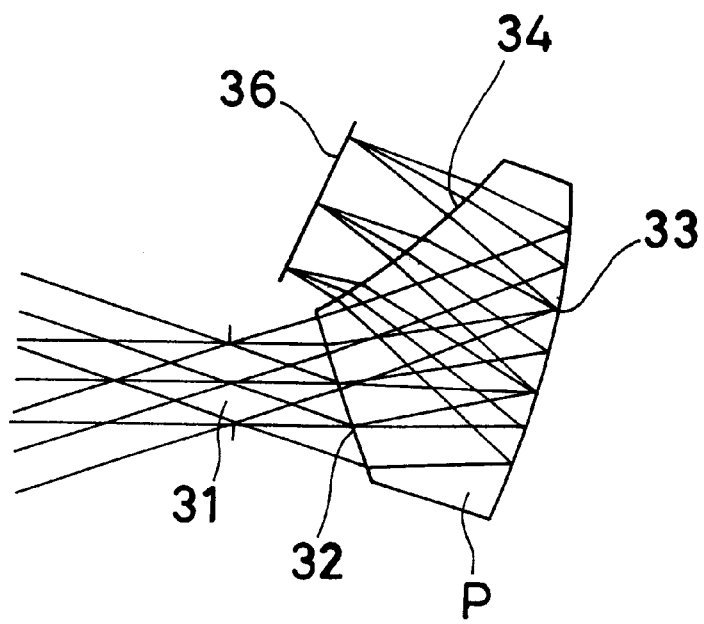
FIG. 9 is a view illustrating one modification of the relay optical element in the image display apparatus according to the invention.

Referring to FIG. 9, the prism P is made up of a first surface 32, a second surface 33 and a third surface 34. Light incident from an entrance pupil 31 enters the prism P upon refraction through the first surface 32. The light is internally reflected at the second surface 33, and then refracted through the third surface 34 upon incidence thereon to form an image on the image plane 36.

Figure 10:
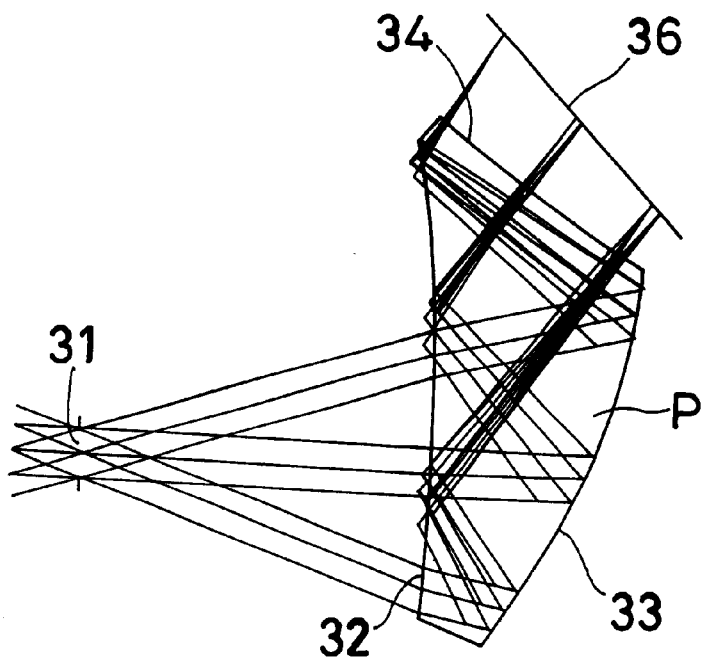
FIG. 10 is a view illustrating another modification of the relay optical element in the image display apparatus according to the invention.

Referring to FIG. 10, the prism P is made up of a first surface 32, a second surface 33 and a third surface 34. Incident light from an entrance pupil 31 enters the prism P upon refraction through the first surface 32, whereupon the light is internally reflected at the second surface 33. The reflected light again enters the first surface 32 where it is now subjected to total reflection, and is refracted through the third surface 34 upon incidence thereon to form an image on the image plane 36.

Figure 11:
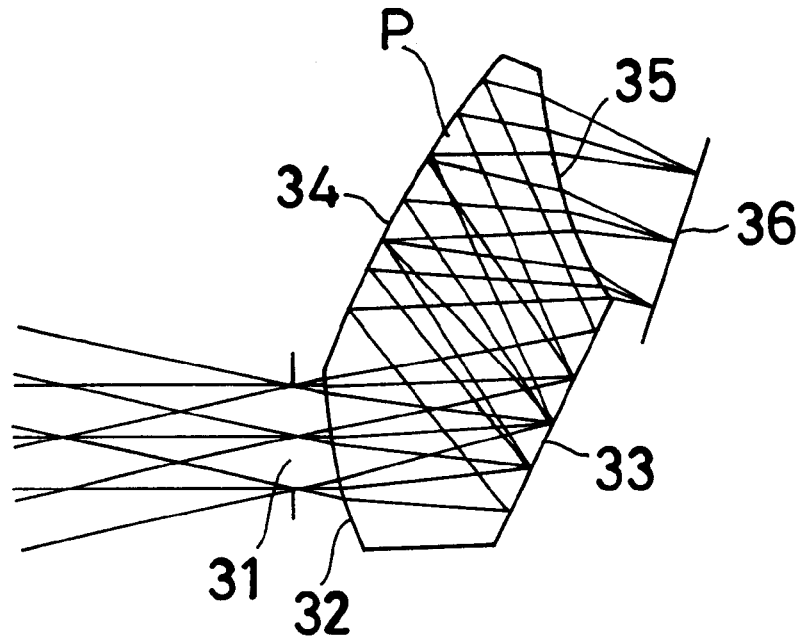
FIG. 11 is a view illustrating yet another modification of the relay optical element in the image display apparatus according to the invention.

Referring to FIG. 11, the prism P is made up of a first surface 32, a second surface 33, a third surface 34 and a fourth surface 35. Incident light from an entrance pupil 31 enters the prism upon refraction through the first surface 32, whereupon the light is internally reflected at the second surface 33. Then, the light is internally reflected at the third surface 34 to form a Z-shaped optical path. Finally, the reflected light is refracted through the fourth surface 35 upon incidence thereon to form an image on the image plane 36.

Figure 12:
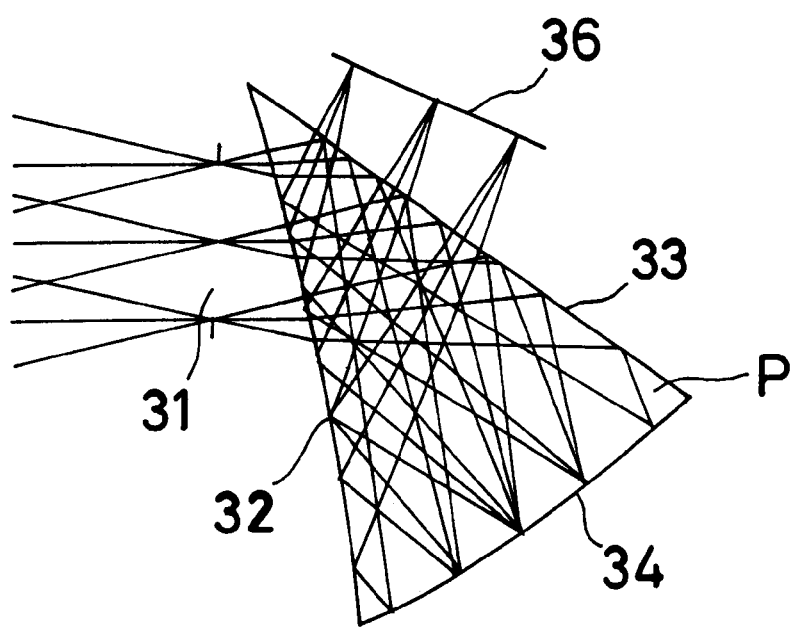
FIG. 12 is a view illustrating a further modification of the relay optical element in the image display apparatus according to the invention.

Referring to FIG. 12, the prism P is made up of a first surface 32, a second surface 33 and a third surface 34. Incident light from an entrance pupil 31 enters the prism P upon refraction through the first surface 31, whereupon the light is internally reflected at the second surface 33 and then at the third surface 34. Then, the reflected light again enters the first surface 32, where it is subjected to total reflection. Finally, the reflected light is now refracted through the second surface 33 upon incidence thereon to form an image on the image plane 36.

Figure 13:
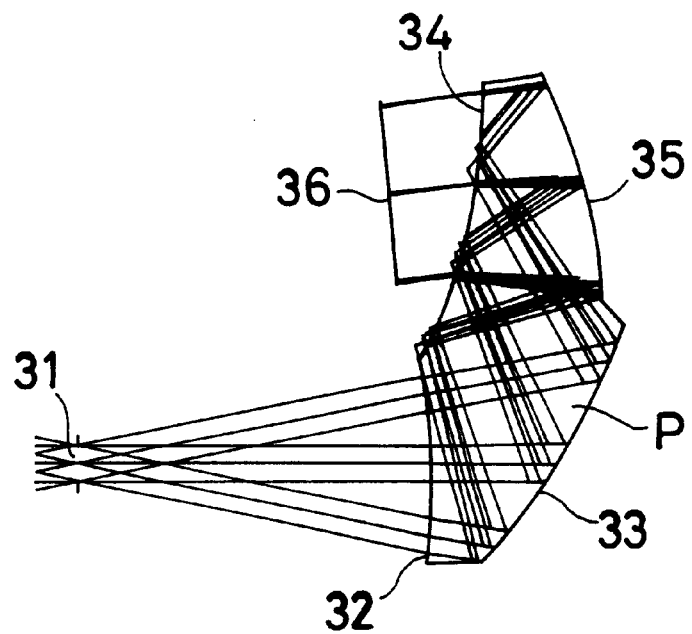
FIG. 13 is a view illustrating a further modification of the relay optical element in the image display apparatus according to the invention.

Referring to FIG. 13, the prism is made up of a first surface 32, a second surface 33, a third surface 34 and a fourth surface 35. Incident light from an entrance pupil 31 enters the prism P upon refraction through the first surface 32, whereupon the light is internally reflected at the second surface 33. Then, the reflected light enters the third surface 34 where it is subjected to total reflection, and then enters the fourth surface 34 where it is internally reflected. Finally, the reflected light again enters the third surface 34 where it is now refracted to form an image on the image plane 36.

Figure 14:
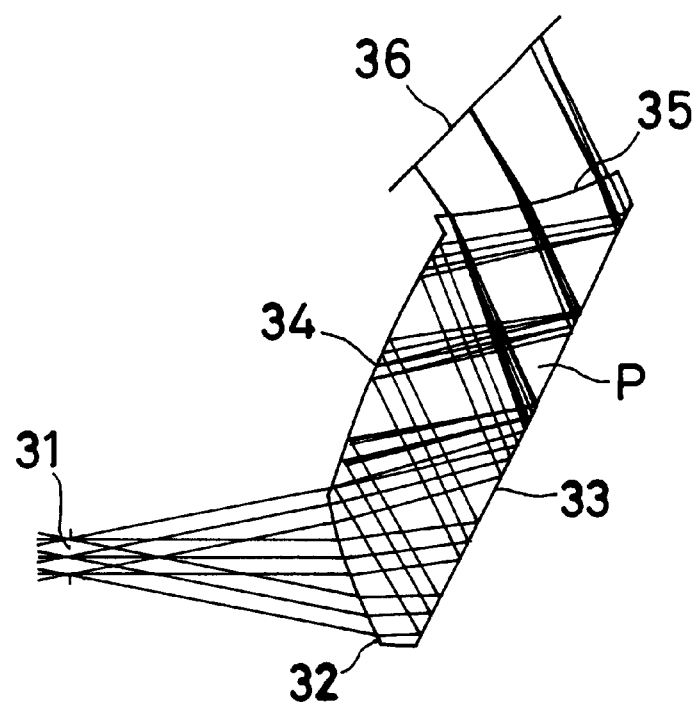
FIG. 14 is a view illustrating a further modification of the relay optical element in the image display apparatus according to the invention.

Referring to FIG. 14, the prism P is made up of a first surface 32, a second surface 33, a third surface 34 and a fourth surface 35. Incident light from an entrance pupil 31 enters the prism upon refraction through the first surface 32, whereupon the light is internally reflected at the second surface 33. Then, the reflected light enters the third surface 34 where it is internally reflected. Then, the reflected light again enters the second surface 33 where it is internally reflected. Finally, the reflected light enters the fourth surface 35 where it is refracted to form an image on the image plane 36.

Figure 15:
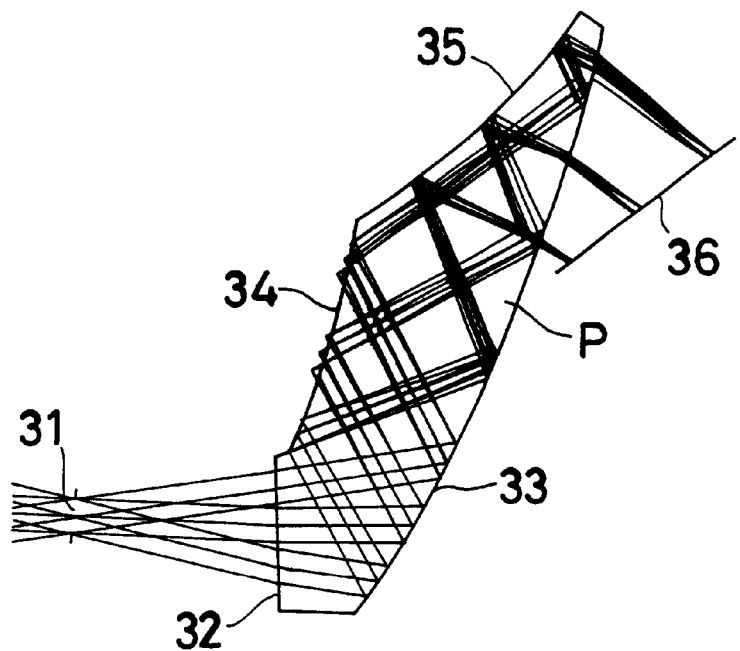
FIG. 15 is a view illustrating a further modification of the relay optical element in the image display apparatus according to the invention.

Referring to FIG. 15, the prism P is made up of a first surface 32, a second surface 33, a third surface 34 and a fourth surface 34. Incident light from an entrance pupil 31 enters the prism P upon refraction through the first surface 32, whereupon the light is internally reflected at the second surface 33. Then, the light enters the third surface 34 where it is internally reflected, and again enters the second surface 33 where it is internally reflected. Then, the reflected light enters the fourth surface 35 where it is internally reflected. Finally, the light again enters the second surface 33 where it is now refracted to form an image on the image plane 36.

Figure 16:
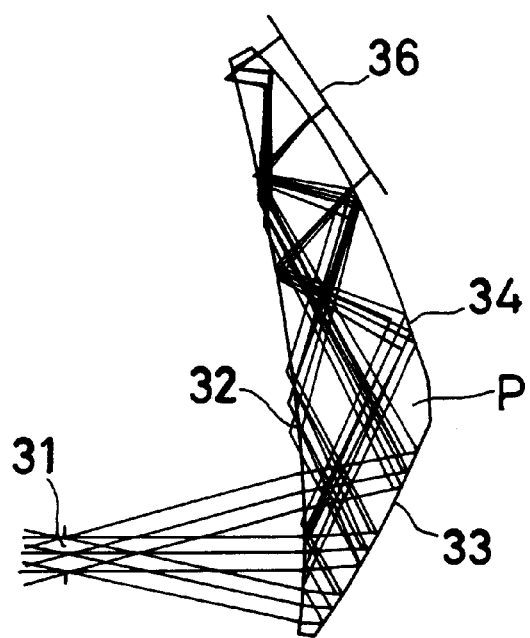
FIG. 16 is a view illustrating a further modification of the relay optical element in the image display apparatus according to the invention.

Referring to FIG. 16, the prism P is made up of a first surface 32, a second surface 33 and a fourth surface 34. Incident light from an entrance pupil 31 enters the prism upon refraction through the first surface 32, whereupon the light is internally reflected at the second surface 33. Then, the light again enters the first surface 32 where it is now subjected to total reflection. Then, the light is internally reflected at the third surface 34, and once again enters the first surface 32 where it is subjected to total reflection. Finally, the light is again incident on the third surface 34 where it is now refracted to form an image on the image plane 36.

Figure 17:
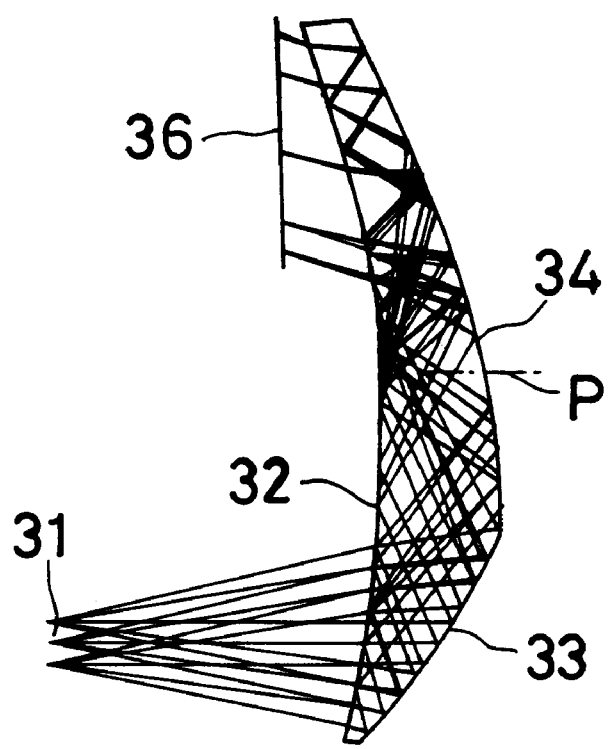
FIG. 17 is a view illustrating a further modification of the relay optical element in the image display apparatus according to the invention.

Referring to FIG. 17, the prism P is made up of a first surface 32, a second surface 33 and a third surface 34. Incident light from an entrance pupil 31 enters the prism P upon refraction through the first surface 32, whereupon the light is internally reflected at the second surface 33. Then, the light again enters the first surface 32 where it is now subjected to total reflection, and is internally reflected at the third surface 34. Then, the light once again enters the first surface 32 where it is subjected to total reflection. Then, the light again enters the third surface 34 where it is internally reflected. Finally, the light yet once again enters the first surface 32 where it is now refracted to form an image on the image plane 36.

A set of such image display apparatus as explained above may be used for observation with one eye, and two such sets may be used for observation with both eyes while they are spaced away from each other by an interpupillary distance. Thus, a stationary or portable image display system may be achieved, which enables images to be observed with one eye or both eyes.

Figure 18:
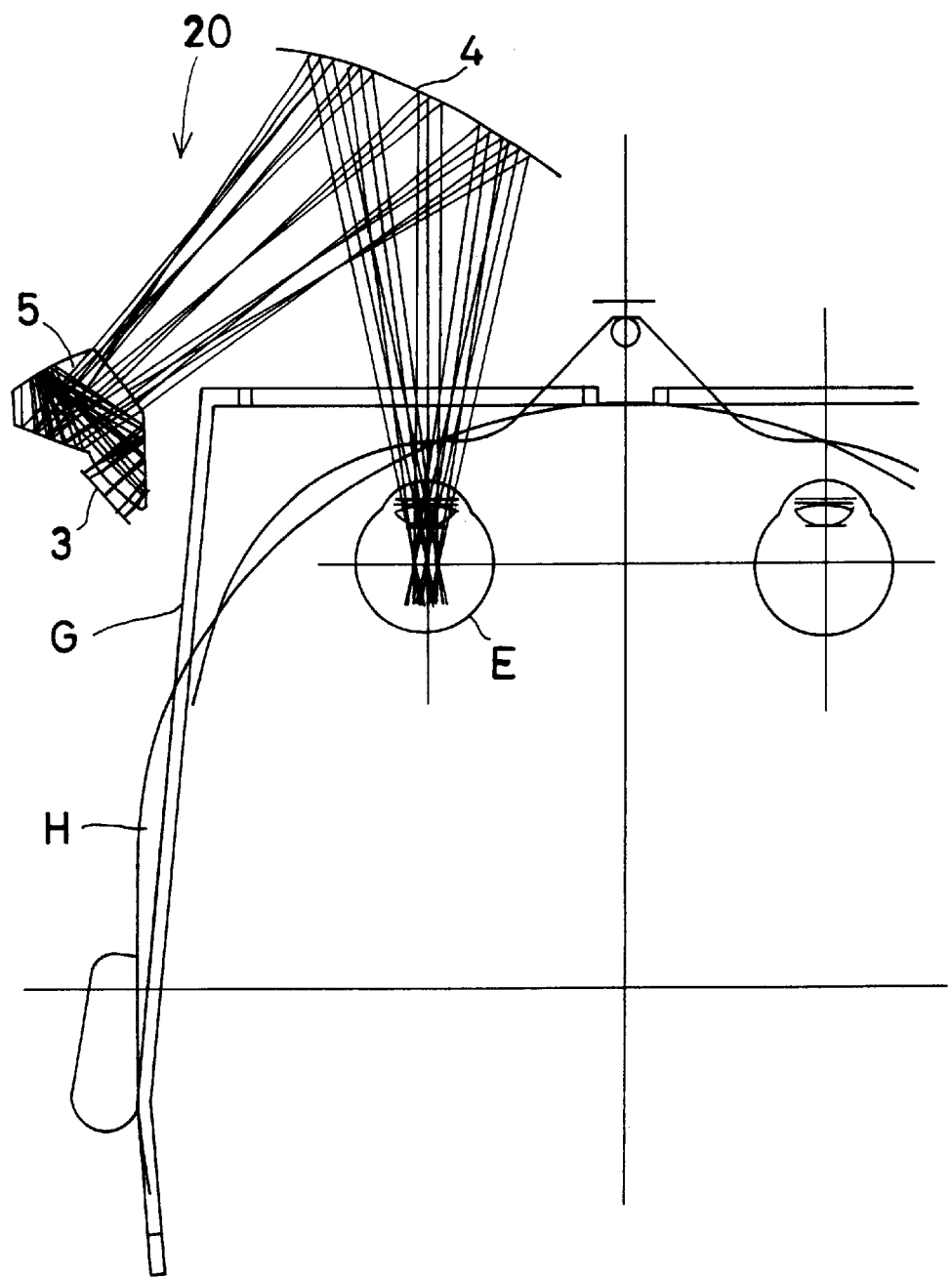
FIG. 18 is a plan schematic illustrative of how one embodiment of the image display apparatus according to the invention is mounted on the head of an observer.
Figure 19:
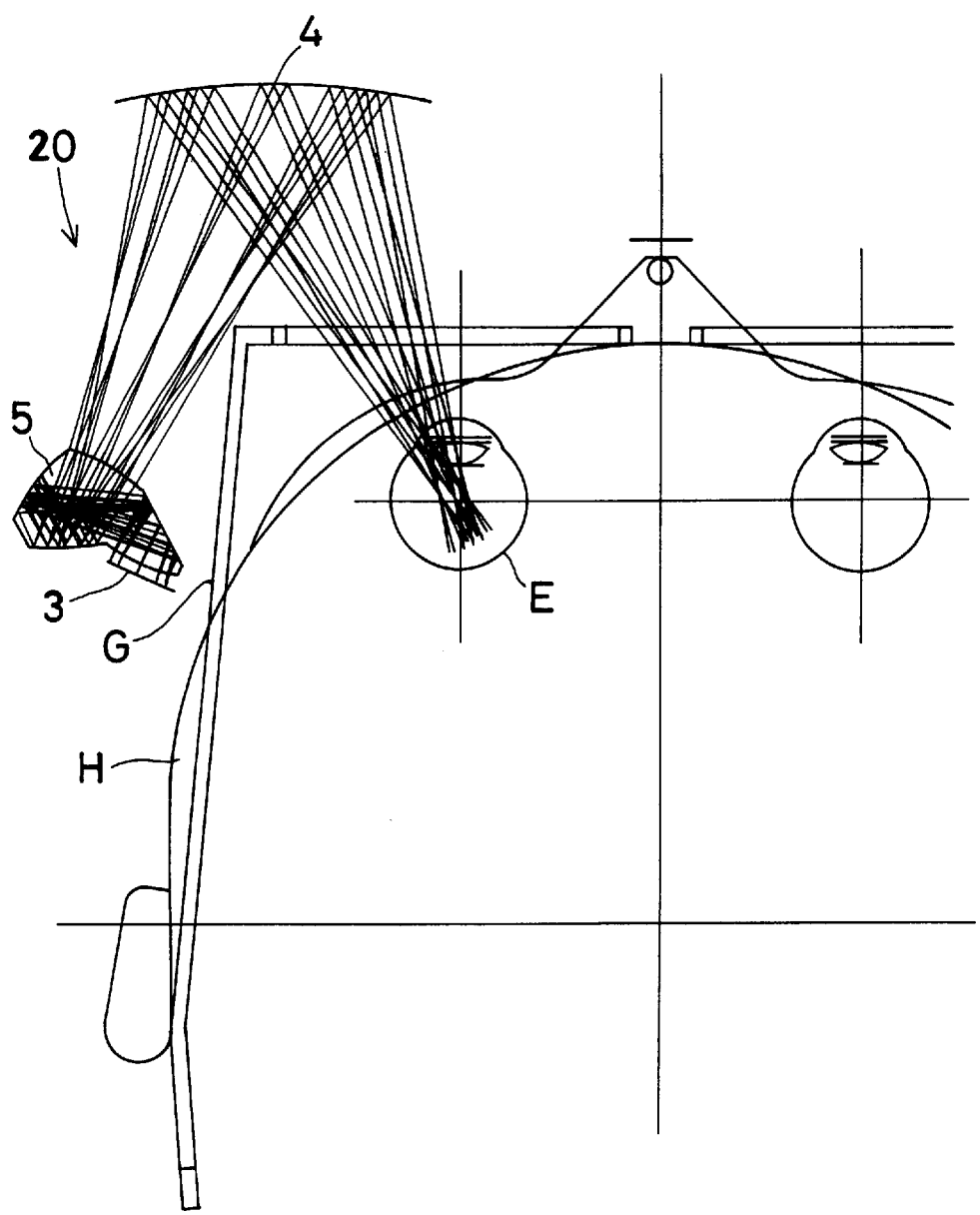
FIG. 19 is a plan schematic illustrative of how another embodiment of the image display apparatus according to the invention is mounted on the head of an observer.
Figure 20:
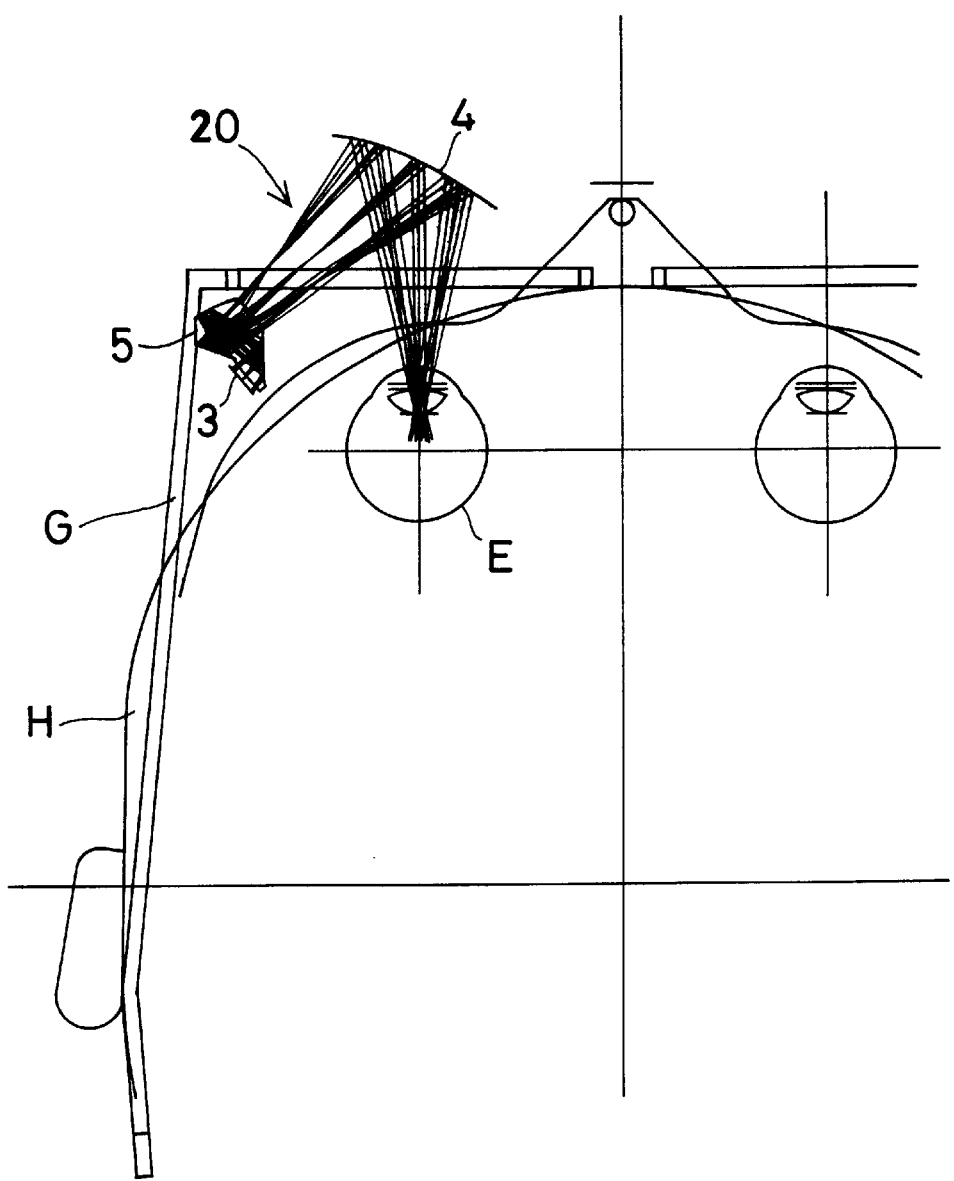
FIG. 20 is a plan schematic illustrative of how yet another embodiment of the image display apparatus according to the invention is mounted on the head of an observer.
Figure 21:
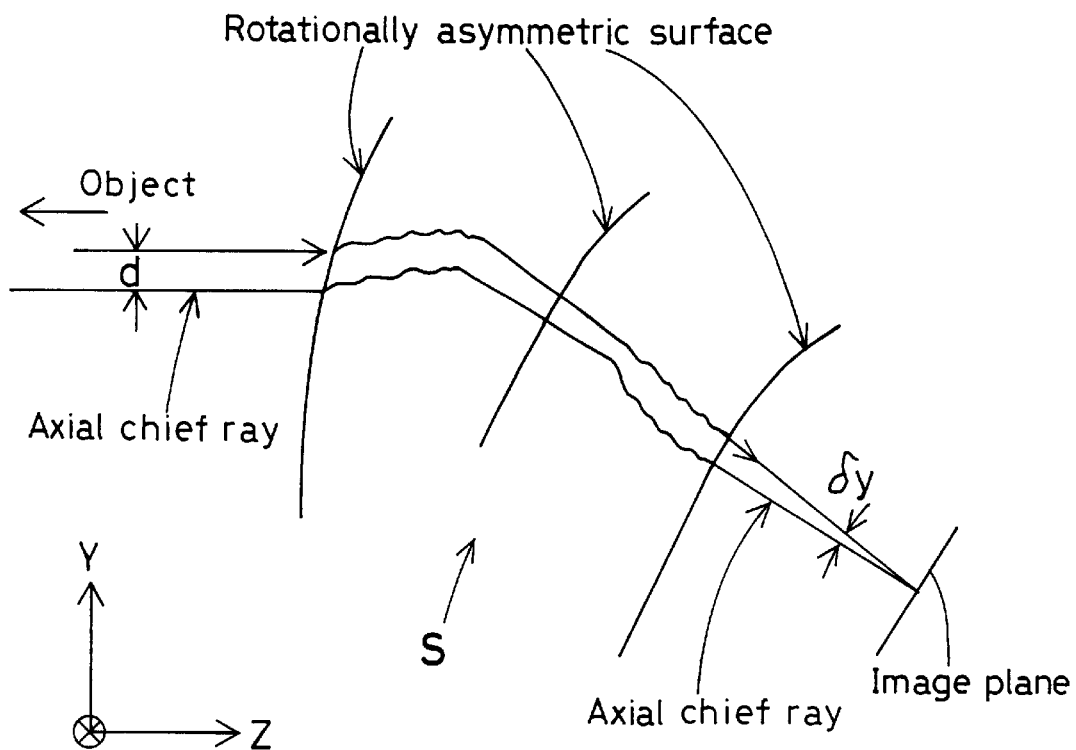
FIG. 21 is a conceptual schematic illustrative of field curvature produced by a decentered reflecting surface.
Figure 22:
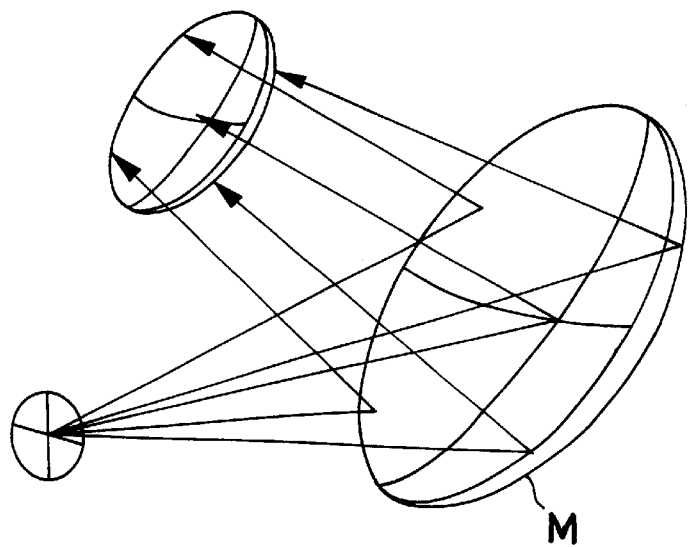
FIG. 22 is a conceptual schematic illustrative of astigmatism produced by a decentered reflecting surface.
Figure 23:
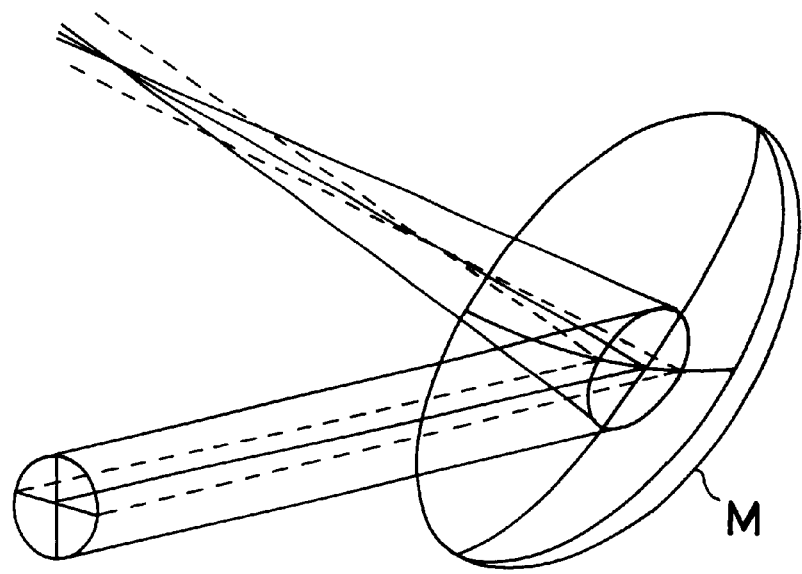
FIG. 23 is a conceptual schematic illustrative of coma produced by a decentered reflecting surface.
Figure 24:
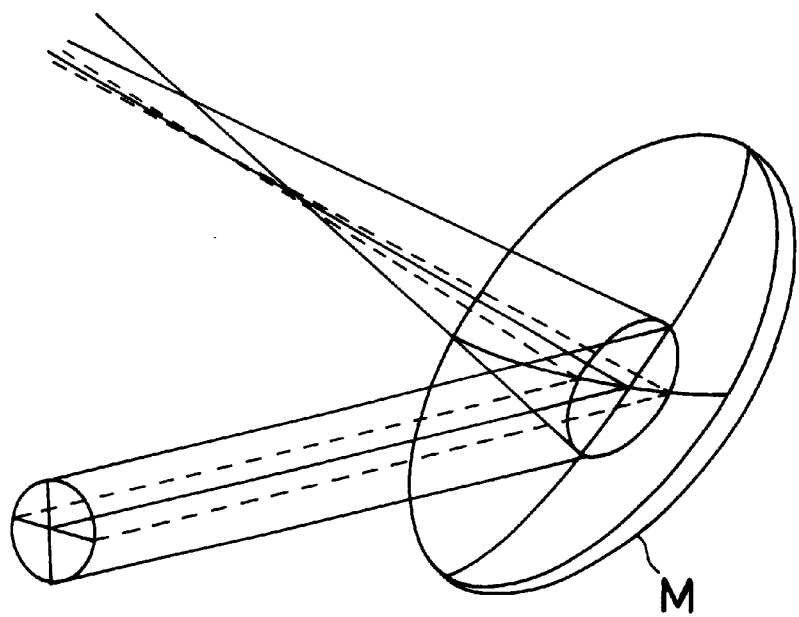
FIG. 24 is a schematic illustrative of the definition of powers of a decentered optical element and a decentered optical surface.

FIGS. 18 to 20 are plan views showing how the image display system for observation with one eye is mounted on the head of an observer. In these drawings, H stands for the head of the observer, E represents the eyeball of the observer, and G indicates the bows of spectacles. In any case, an image display system 2 such as that explained in Example 6 or 7 is mounted on the left eye. In the FIG. 18 embodiment, the observer can observe at a vergence angle of 0° an image displayed on an LCD 3. In the FIG. 19 embodiment, an image displayed on an LCD 3 is projected onto the periphery of the field of view while the observer looks at the outside world. The observer can look at the image displayed on the LCD 3 when the observer intentionally turns the eyeball E to bring the axis of vision in alignment with the left side of the field of view. In the FIG. 20 embodiment, the image display system 20 is integrally attached to the bows E of spectacles.

According to the present invention as can be understood from the foregoing explanation, it is possible to achieve a slimmed-down, well weight-balanced image display apparatus which, while a wide angle of view is ensured, has high resolving power and a large exit pupil diameter. In particular, the present invention can provide a high-definition image display apparatus capable of displaying a high-pixel image having 640×480 pixels (VGA) or more.

What we claim is:

1. An image display apparatus comprising an image display device and a viewing optical system which forms an exit pupil for viewing an image displayed on said image display device and has generally positive refractive power, wherein:

said viewing optical system comprises a relay optical element constructed and arranged to form said image in the form of a relay image and an ocular optical element constructed and arranged to form an exit pupil for guiding said relay image to an observer, said relay optical element comprising a prism member formed of a medium having a refractive index n that is n>1, said prism member comprising an entrance surface through which a light beam leaving said image display device enters a prism, at least one reflecting surface at which said light beam is reflected within said prism, and an exit surface through which said light beam leaves said prism, with said, at least one reflecting surface having a curved surface shape capable of imparting power to said light beam, said curved surface is defined by a rotationally asymmetric surface to correct aberrations produced by decentration, and said ocular optical element including at least one concave mirror located between said exit surface of said prism member and a viewing side, said concave mirror being defined by a rotationally asymmetric curved surface adapted to impart optical power on said light beam upon reflection and to correct aberrations produced by decentration.

2. An image display apparatus according to claim 1, wherein said prism member comprises at least two reflecting surfaces, each having a rotationally asymmetric curved surface shape adapted to impart optical power on a light beam and to correct aberrations produced by decentration.

3. The image display apparatus according to claim 2, wherein said prism member comprises a first surface that is an entrance surface and reflects a light beam within said prism, said light beam being reflected at a second surface within said prism, a second surface that reflects a light beam incident from said first surface on said prism, and a third surface that allows said light beam reflected at said second surface to leave said prism.

4. The image display apparatus according to claim 3, wherein both said first surface and said second surface are designed to have a rotationally asymmetric surface shape capable of imparting power to the light beam and making correction for aberrations produced by decentration.

5. The image display apparatus according to claim 3 or 4, wherein said third surface is designed to have a rotationally asymmetric surface shape capable of imparting power to the light beam and making correction for aberrations produced by decentration.

6. An image display apparatus comprising an image display device and a viewing optical system which forms an exit pupil for viewing an image displayed on said image display device and has generally positive refractive power, wherein:

said viewing optical system comprises a relay optical element constructed and arranged to form said image in the form of a relay image and an ocular optical element constructed and arranged to form an exit pupil for guiding said relay image to an observer, said relay optical element comprising a prism member formed of a medium having a refractive index n that is n>1, said prism member comprising an entrance surface through which a light beam leaving said image display device enters said prism, at least one reflecting surface at which said light beam is reflected within said prism, and an exit surface through which said light beam leaves said prism, with said, at least one reflecting surface having a curved surface shape capable imparting power to said light beam, said curved surface is defined by a rotationally asymmetric surface to correct aberrations produced by decentration, said ocular optical element including at least one concave mirror located between said exit surface of said prism member and a viewing side, said concave mirror being defined by a rotationally asymmetric curved surface adapted to impart optical power on said light beam upon reflection and to correct aberrations produced by decentration, said prism member comprises at least two reflecting surfaces, each having a rotationally asymmetric curved surface shape adapted to impart optical power on a light beam and to correct aberrations produced by decentration, said prism member comprises at least four optical action surfaces including a first surface that is said entrance surface, a second surface that reflects a light beam within the prism, a third surface that reflects the light beam within the prism and a fourth surface that is said exit surface, said first surface and said second surface being opposed to each other with a medium located therebetween, said third surface and said fourth surface being opposed to each other with a medium located therebetween, and an optical path for connecting said first surface with said second surface intersecting an optical path for connecting said third surface with said fourth surface.

7. The image display apparatus according to claim 6, wherein both said second surface and said third surface are designed to have a rotationally asymmetric surface shape capable of imparting power to the light beam and making correction for aberrations produced by decentration.

8. The image display apparatus according to claim 6 or 7, wherein at least one of said first surface and said fourth surface has a rotationally asymmetric surface shape capable of imparting power to the light beam and making correction for aberrations produced by decentration.

9. An image display apparatus comprising an image display device and a viewing optical system which forms an exit pupil for viewing an image displayed on said image display device and has generally positive refractive power, wherein:

said viewing optical system comprises a relay optical element constructed and arranged to form said image in the form of a relay image and an ocular optical element constructed and arranged to form an exit pupil for guiding said relay image to an observer, said relay optical element comprising a prism member formed of a medium having a refractive index n that is n>1, said prism member comprising an entrance surface through which a light beam leaving said image display device enters the prism, at least one reflecting surface at which said light beam is reflected within said prism, and an exit surface through which said light beam leaves said prism, with said at least one reflecting surface having a curved surface shape capable imparting power to said light beam, said curved surface is defined by a rotationally asymmetric surface to correct aberrations produced by decentration, said ocular optical element including at least one concave mirror located between said exit surface of said prism member and a viewing side, said concave mirror being defined by a rotationally asymmetric curved surface adapted to impart optical power on said light beam upon reflection and to correct aberrations produced by decentration, said prism member comprises at least two reflecting surfaces, each having a rotationally asymmetric curved surface shape adapted to impart optical power on a light beam and to correct aberrations produced by decentration, said prism member comprises at least five optical action surfaces including a first surface that is said entrance surface, a second surface that reflects a light-beam within a prism, a third surface that reflects a light beam within the prism, a fourth surface that reflects a light beam within the prism and a fifth surface that is said exit surface, said second surface and said third surface being opposed to each other with a medium located therebetween, said fourth surface and said fifth surface being opposed to each other with a medium located therebetween, and an optical path for connecting said second surface with said third surface intersecting an optical path for connecting said fourth surface with said fifth surface.

10. The image display apparatus according to claim 9, wherein both said third surface and said fourth surface are designed to have a rotationally asymmetric surface shape capable of imparting power to the light beam and making correction for aberrations produced by decentration.

11. The image display apparatus according to claim 9 or 10, wherein said second surface has a rotationally asymmetric surface shape adapted to impart optical power on the light beam and to correct aberrations produced by decentration.

12. The image display apparatus according to claim 10, wherein said second, third, and fourth surfaces each have positive power.

13. The image display apparatus according to claim 9 or 10, wherein at least one of said first surface and said fifth surface is designed to have a rotationally asymmetric surface shape adapted to impart optical power on the light beam and to correct aberrations produced by decentration.

14. The image display apparatus according to any one of claims 1 to 4, 6, 7, 9 and 10, wherein rotationally asymmetric surfaces of said prism member and said concave image are each defined by a free form surface symmetric with respect to a plane, said free-form surface shape having only one symmetric plane.

15. The image display apparatus according to claim 14, wherein said only one symmetric plane of each of said free-form surfaces is formed on the same plane.

16. The image display apparatus according to any one of claims 1 to 4, 6, 7, 9 and 10, wherein said concave mirror in said ocular optical element is made up of a half coated mirror capable of observing an outside world.

17. The image display apparatus according to any one of claims 1 to 4, 6, 7, 9 and 10, wherein said concave mirror in said ocular optical element is made up of a diffraction type optical element or hologram capable of observing an outside world.

18. The image display apparatus according to any one of claims 1 to 4, 6, 7, 9 and 10, wherein said image display apparatus satisfies the following condition:

$$0.5 < PX/PY < 1.3 \qquad (1)$$

where PX is a power of an overall optical system in an X direction and PY is a power of said overall optical system in a Y direction provided that a X-axis direction is defined by a decentration direction of said overall optical system, an X-Z plane is defined by a plane parallel with an axial chief ray, and said Y direction is defined by a direction perpendicular to said X-Z plane.

19. The image display apparatus according to any one of claims 1 to , 6, 7, 9 and 10 wherein said image display apparatus satisfies at least one of the following conditions:

$$0.1<|PXs3/PX|<2 \tag{2}$$

$$0.1<|PYs3/PY|<2 \tag{3}$$

where PX is a power of an overall optical system in an X direction, PY is a power of said overall optical system in a Y direction, PXs3 is a power of said concave mirror in said X direction, and PYs3 is a power of said concave mirror in said Y direction provided that an X-axis direction is defined by a decentration direction of said overall optical system, an X-Z plane is defined by a plane parallel with an axial chief ray, and said Y direction is defined by a direction perpendicular to said X-Z plane.

20. The image display apparatus according to any one of claims 1 to 4, 6, 7, 9 and 10 wherein said image display apparatus satisfies at least one of the following conditions:

$$0.01<|PPX/PX|<3 \tag{4}$$

$$0.01<|PPY/PY|<3 \tag{5}$$

where PX is a power of an overall optical system in an X direction, PY is a power of said overall optical system in a Y direction, PPX is a power of said relay optical element in said X direction, and PPY is a power of said relay optical element in said Y direction provided that an X-axis direction is defined by a decentration direction of said overall optical system, an X-Z plane is defined by a plane parallel with an axial chief ray, and said Y direction is defined by a direction perpendicular to said X-Z plane.

21. The image display apparatus according to any one of claims 1 to 4, 6, 7, 9 and 10 wherein said image display apparatus satisfies the following condition:

$$10°<\Theta<45° \tag{6}$$

where $\Theta$ is an angle of incidence of an axial chief ray reflected at said concave mirror.

* * * * *